United States Patent
Suzuki et al.

(10) Patent No.: US 8,409,737 B2
(45) Date of Patent: Apr. 2, 2013

(54) SEALED BATTERY CELL AND METHOD OF MANUFACTURING THE SAME

(75) Inventors: Katsunori Suzuki, Nabari (JP); Yuki Hato, Hitachinaka (JP)

(73) Assignee: Hitachi Vehicle Energy, Ltd., Hitachinaka-shi (JP)

( * ) Notice: Subject to any disclaimer, the term of this patent is extended or adjusted under 35 U.S.C. 154(b) by 287 days.

(21) Appl. No.: 13/013,957

(22) Filed: Jan. 26, 2011

(65) Prior Publication Data

US 2011/0189513 A1    Aug. 4, 2011

(30) Foreign Application Priority Data

Jan. 29, 2010    (JP) .................................. 2010-018633

(51) Int. Cl.
*H01M 2/12*    (2006.01)
(52) U.S. Cl. .............. 429/53; 429/82; 429/83; 429/163; 429/175
(58) Field of Classification Search .................... 429/82, 429/83, 163, 175
See application file for complete search history.

(56) References Cited

FOREIGN PATENT DOCUMENTS

| JP | 2001-126682 A | 5/2001 |
|---|---|---|
| JP | 2005-285637 A | 10/2005 |
| JP | 2007-213819 A | 8/2007 |
| JP | 2009-266782 A | 11/2009 |
| WO | WO 2011-092845 A1 | 8/2011 |

OTHER PUBLICATIONS

Japanese Office Action dated May 1, 2012 including English-language translation (Ten (10) pages).

*Primary Examiner* — Patrick Ryan
*Assistant Examiner* — Ben Lewis
(74) *Attorney, Agent, or Firm* — Crowell & Moring LLP

(57) ABSTRACT

An upper base portion of a top portion of a battery cell cap functions as a positive terminal, and paths for flow of electrical current are defined between the top portion and portions for welding. The portions for welding are positioned to face a side wall region between a pair of apertures adjacently provided in the top portion, and the current flowing regions are defined between the portions for welding and the side wall regions of the top portion facing to the portions for welding, each forming a symmetrical current flowing region.

12 Claims, 13 Drawing Sheets

SEALED BATTERY CELL AND METHOD OF MANUFACTURING THE SAME

INCORPORATION BY REFERENCE

The disclosure of the following priority application is herein incorporated by reference: Japanese Patent Application No. 2010-018633 filed Jan. 29, 2010.

BACKGROUND OF THE INVENTION

1. Field of the Invention

The present invention relates to a sealed battery cell, and to a manufacturing method for a sealed battery cell.

2. Description of the Related Art

In the prior art, a sealed battery cell is a general purpose consumer electrical product, and recently, in particular, large numbers of lithium batteries have come into use. Since the energy density of lithium batteries is high, their development as onboard power supplies for electric vehicles (EVs) and hybrid vehicles (HEVs) is progressing rapidly. As it is also required to apply high electrical current for these vehicles, measures to lower the electrical resistance of the various components are being introduced for lithium batteries, such as welding together the top cover and the diaphragm of a lid unit (a sealing lid) and so on (refer to Japanese Laid-Open Patent Publication 2007-213819).

SUMMARY OF THE INVENTION

With the lid unit described in the above referenced Japanese Laid-Open Patent Publication 2007-213819, a flange portion is provided upon the peripheral part of the diaphragm, and this flange portion is folded back and swaged to the top cover. And it has also been contemplated to lower the electrical resistance by welding the flange portion to the upper surface of the top cover. However there is a requirement for yet further reduction of the electrical resistance, in order to allow high electrical current to flow in a lithium ion secondary battery cell that is used in a plug-in hybrid vehicle or an electric vehicle, upon which increasing demands are made for high capacity.

According to the 1st aspect of the present invention, a sealed battery cell comprising a generating unit, a battery cell container within which the generating unit is stored, and a sealing lid that seals the battery cell container, wherein: the sealing lid comprises a cap that constitutes an external positive electrode terminal for the sealed battery cell, and a cap casing that is integrated with the cap; the cap is a hat shape having a top portion and an annular portion, of which top portion is the external positive electrode terminal, and projects to the exterior of the battery cell in axial direction; a plurality of gas venting apertures are provided upon a side wall of the top portion of the cap at predetermined intervals; an outer circumferential region of the cap casing is fixed to an upper surface of the annular portion of the cap by folding back and swaging, and is welded to the cap at a welding spot where this fixing by swaging is performed; and the welding spot confront a portion of the side wall of the top portion that are between an adjacent pair of the gas venting apertures provided in the side wall of the top portion.

According to the 2nd aspect of the present invention, in a sealed battery cell according to the 1st aspect, it is preferred that the welding spot confront a central portions of the side wall of the top portion defined between the adjacent pair of gas venting apertures.

According to the 3rd aspect of the present invention, in a sealed battery cell according to the 1st aspect, it is preferred that, when N gas venting apertures are present, N welding spots that are provided, where N is an natural number.

According to the 4th aspect of the present invention, in a sealed battery cell according to the 1st aspect, it is preferred that, in the cap casing, a plurality of cleavage grooves that cleave and open when an internal pressure of the sealed battery cell rises above a predetermined threshold value are provided, and the plurality of gas venting apertures are provided in positions that correspond to the plurality of cleavage grooves.

According to the 5th aspect of the present invention, in a sealed battery cell according to the 4th aspect, it is preferred that the gas venting apertures in the cap and the cleavage grooves in the cap casing are provided at equal angular intervals around the circumferential direction of the sealing lid, and the cap and the cap casing are integrated together at a phase angle at which the gas venting apertures and the cleavage grooves mutually confront one another.

According to the 6th aspect of the present invention, in a sealed battery cell according to the 1st aspect, it is preferred that a projecting tag for welding is formed at the outer circumferential region of the cap casing, and in a state that the outer circumferential region of the cap casing is folded back and swaged to the upper surface of the annular portion of the cap, the cap and the cap casing are welded together, assuming the projecting tag for welding as the welding spot.

According to the 7th aspect of the present invention, in a sealed battery cell according to the 6th aspect, it is preferred that the projecting tag for welding have a link portion that connects to the outer circumferential region of the cap casing and a tip end portion that is widened out from the link portion towards the center of the cap.

According to the 8th aspect of the present invention, in a sealed battery cell according to the 1st aspect, it is preferred that the cap and the cap casing are welded together by friction stir welding.

According to the 9th aspect of the present invention, a sealed battery cell comprising a generating unit, a battery cell container within which the generating unit is stored, and a sealing lid that seals the battery cell container, wherein: the sealing lid comprises a cap that constitutes an external positive electrode terminal for the sealed battery cell and a cap casing that is integrated with the cap; the cap is a hat shape having a top portion and an annular portion, of which top portion is the external positive electrode terminal and projects to the exterior of the battery cell in axial direction; a plurality of gas venting apertures are provided upon a side wall of the top portion of the cap at predetermined intervals; an outer circumferential region of the cap casing is fixed to an upper surface of the annular portion of the cap by folding back and swaging, and is welded to the cap at a welding spot where this fixing by swaging is performed; and a positional relationship between the welding spot and the gas venting apertures is regulated so that a path for electrical current between the welding spot and the side wall of the top portion is not divided by the gas venting apertures.

According to the 10th aspect of the present invention, a sealed battery cell comprising a generating unit, a battery cell container within which the generating unit is stored, and a sealing lid that seals the battery cell container, wherein: the sealing lid comprises a cap that constitutes an external positive electrode terminal for the sealed battery cell, and a cap casing that is integrated with the cap; the cap is a hat shape having a top portion and an annular portion, of which top portion is the external positive electrode terminal, and projects to the exterior of the battery cell in axial direction; a plurality of apertures for venting gas are provided upon a side wall of the top portion of the cap at predetermined intervals; an outer circumferential region of the cap casing is fixed to an upper surface of the annular portion of the cap by folding back and swaging, and is welded to the cap at a welding spot where this fixing by swaging is performed; and a positional relationship between the welding spot and the gas venting apertures is regulated so that the gas venting apertures do not lie upon a straight line that join the welding spot and the center of the cap.

According to the 11th aspect of the present invention, a method of manufacturing a sealed battery cell that comprises a generating unit, a battery cell container within which the generating unit is stored, and a sealing lid that seals the battery cell container, comprises: a process of manufacturing the generating unit; a process of manufacturing the sealing lid; a process of, after putting the generating unit into the battery cell container, electrically connecting the generating unit, an external positive electrode terminal of the sealing lid, and an external negative electrode terminal of a battery cell bottom surface; and a process of, after putting the generating unit into the battery cell container, sealing the battery cell container with the sealing lid; and wherein: the process of manufacturing the sealing lid comprises a process of manufacturing the cap, a process of manufacturing the cap casing, and a process of integrating the cap and the cap casing; the process of manufacturing the cap comprises: a process of forming a hat shape having a top portion that projects to the exterior of the battery cell, and an annular portion; and a process of providing a plurality of gas venting apertures at predetermined intervals in the side wall of the top portion; and the process of integrating the cap and the cap casing comprises: a process of fixing a circumferential region of the cap casing to an upper surface of the annular portion of the cap by folding back and swaging; a process of welding the cap and the cap casing together at a welding spot on this folded back circumferential region; and a process of, before the swage fixing, performing position alignment of the cap and the cap casing, so that the welding spot at which the welding is performed confront the top portion side wall at a location between an adjacent pair of gas venting apertures that are provided in the side wall of the top portion of the cap.

According to the 12th aspect of the present invention, in a method of manufacturing a sealed battery cell according to the 11th aspect, it is preferred that the cap and the cap casing are welded together by friction stir welding.

According to the sealed battery cell and the manufacturing method thereof according to the present invention, it is possible to reduce the electrical resistance while ensuring good water sealing performance for the sealing lid.

DESCRIPTION OF THE PREFERRED EMBODIMENTS

The present invention relates to a structure that can reduce the electrical resistance value of a sealing lid that seals an aperture in a battery cell container; in the following, an embodiment in which the sealed battery cell of the present invention is applied to a cylindrical type lithium ion secondary battery cell will be explained with reference to the drawings.

Embodiment 1

Construction of a Sealed Battery Cell

Figure 1:
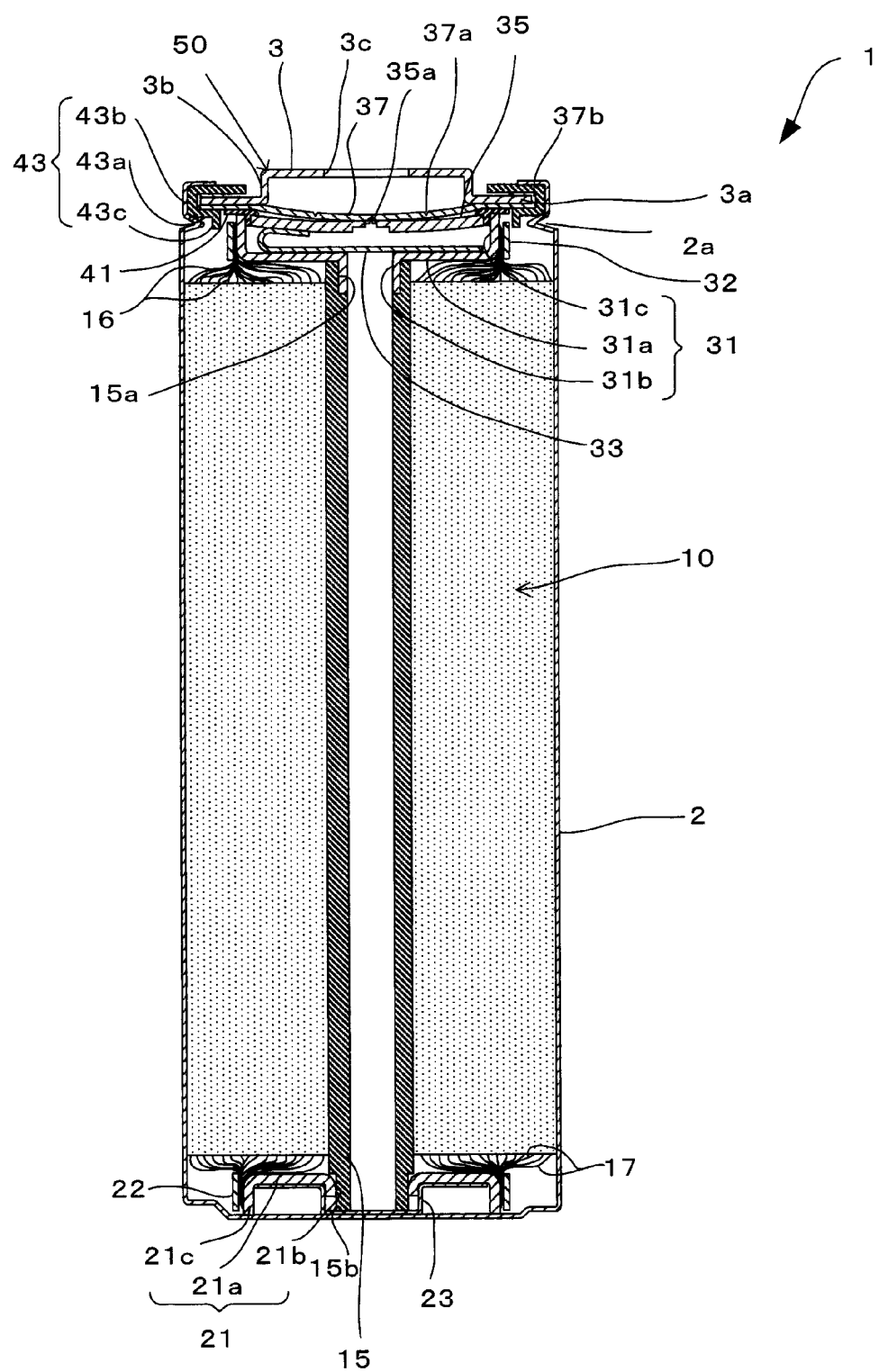
FIG. 1 is a sectional view showing a first embodiment of the sealed battery cell of the present invention.
Figure 2:
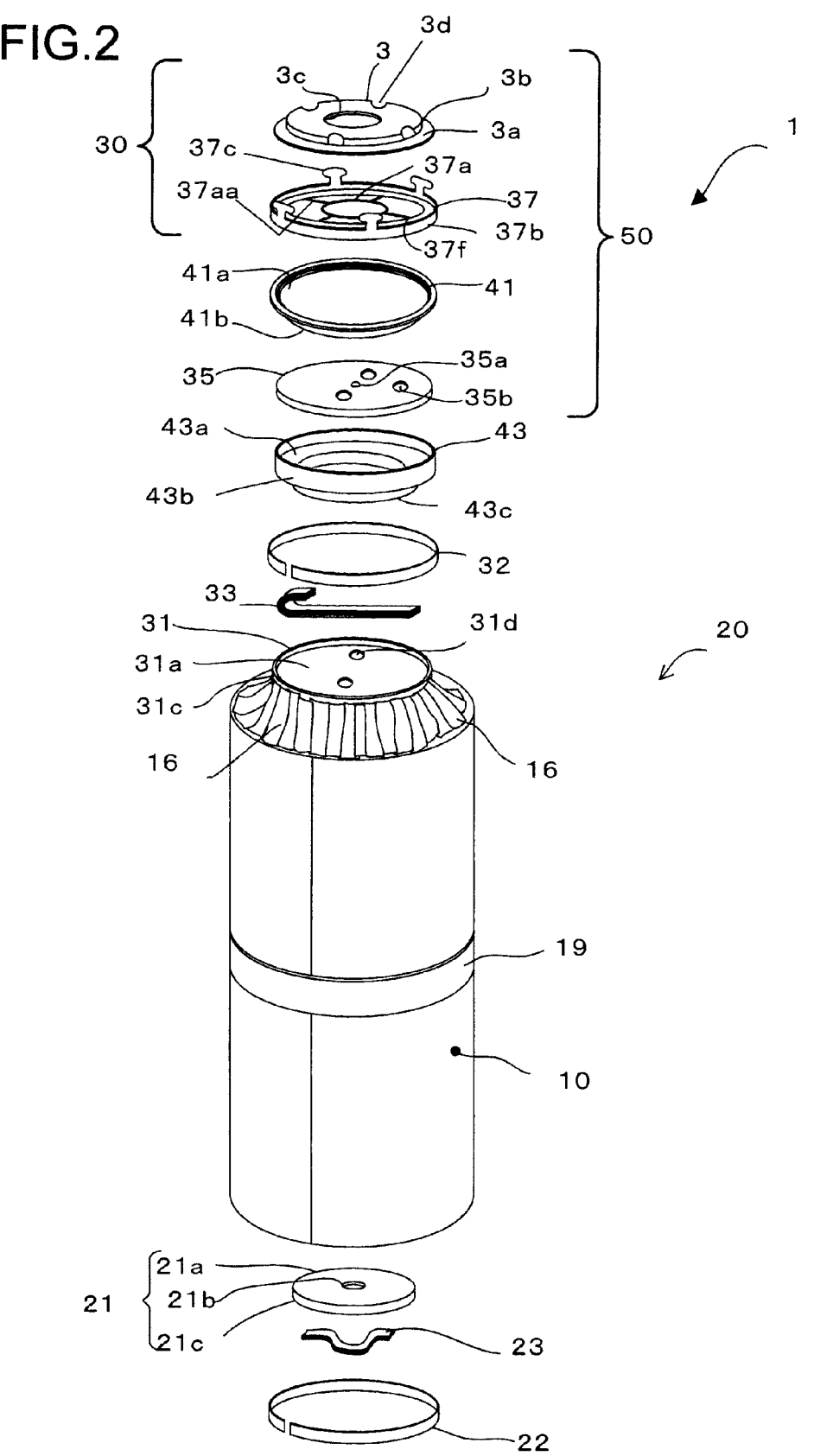
FIG. 2 is an exploded perspective view of the sealed battery cell shown in FIG. 1.

FIG. 1 is a vertical sectional view showing a first embodiment of the sealed battery cell of the present invention, and FIG. 2 is an exploded perspective view of the sealed battery cell shown in FIG. 1. The sealed battery cell 1, for example, may be shaped as a cylinder that has an external shape of diameter 40 mm and a height of 110 mm. This cylindrical type secondary battery cell 1 holds a generating unit 20 that will be explained hereinafter in the interior of a cylindrical type battery cell container 2 that has a bottom, and the opening portion of this container 2 is sealed by a sealing lid 50. First the generating unit 20 will be explained, and then the sealing lid 50 will be explained.

The Battery Cell Container 2

On this cylindrical type battery cell container 2 with a bottom, a groove 2*a* that projects inwards towards the interior of the battery cell container 2 is formed at around the upper end portion thereof, that is its open end.

The Generating Unit 20

Figure 3:
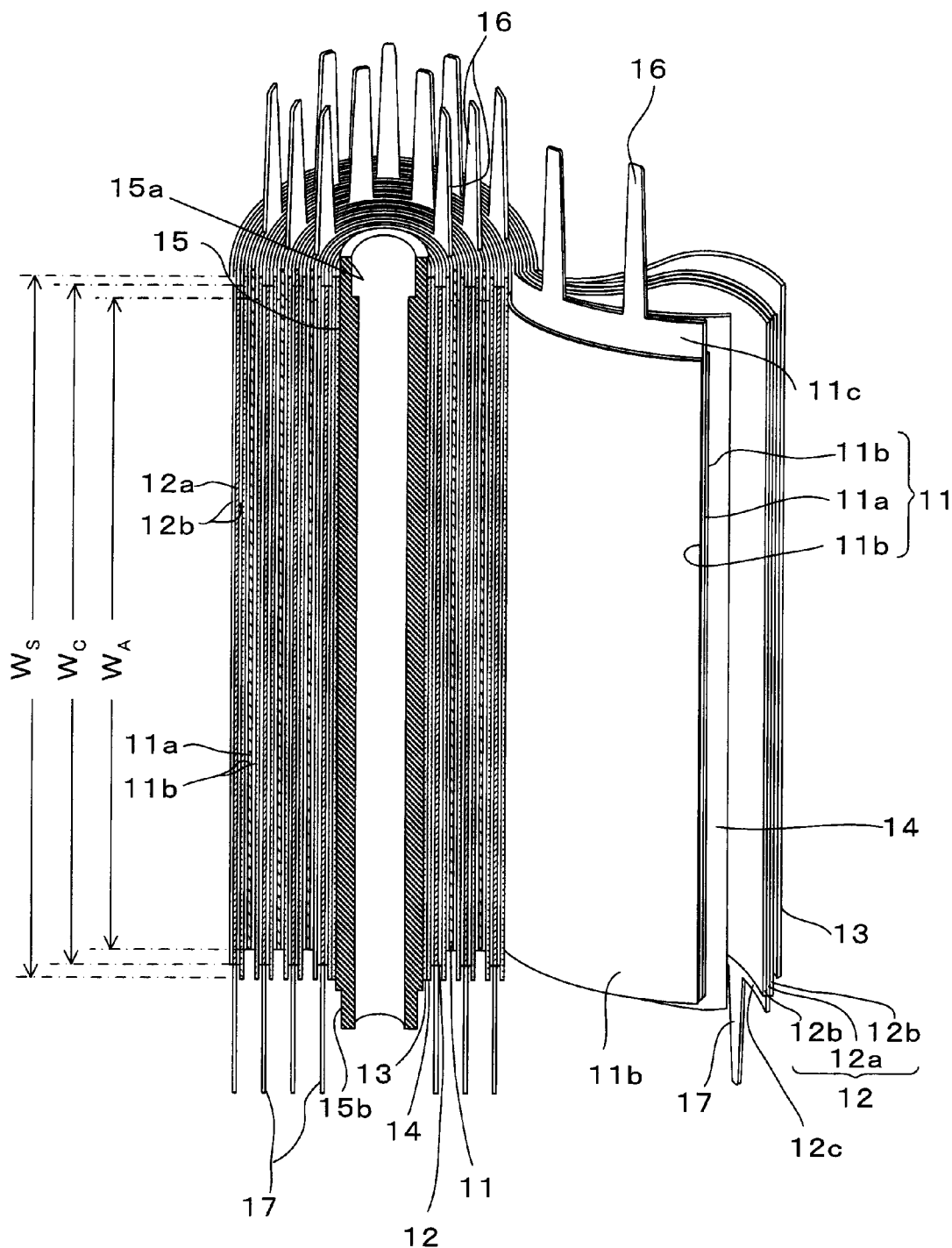
FIG. 3 is a perspective view of an electrode group of FIG. 1, showing it in a partly cut away state so that its details are visible.

As will be explained below, the generating unit 20 is made as an integral unit that includes an electrode group 10, a positive electrode current collecting member 31, and a negative electrode current collecting member 21. The electrode group 10 has a winding core 15 at its central portion, and a positive electrode, a negative electrode, and separators are wound around this winding core. FIG. 3 shows the detailed construction of the electrode group 10, and is a perspective view showing the electrode group 10 in a state with a portion thereof cut away. As shown in FIG. 3, this electrode group 10 has a structure in which a positive electrode 11, a negative electrode 12, and first and second separators 13 and 14 are wound around the outside of the winding core 15.

In this electrode group 10, at its innermost, a first separator 13 is wound around and contacts the outer circumferential surface of the winding core 15, and then, outside this first separator 13, a negative electrode 12, a second separator 14, and a positive electrode 11 are laminated in that order, and are wound up. And, inside the innermost winding of the negative electrode 12, the first separator 13 and the second separator 14 are wound a certain number of times (in FIG. 3, once). Furthermore, the negative electrode 12 appears on the outside, with the first separator 13 being wound around it. And, on the outside, the first separator 13 is held together with adhesive tape 19 (refer to FIG. 2).

The positive electrode 11 is made from aluminum foil and has an elongated shape, and includes a positive electrode sheet 11a and a processed positive electrode portion in which a positive electrode mixture is applied to form a layer 11b on both sides of this positive electrode sheet 11a. The upper side edge of the positive electrode sheet 11a along the longitudinal direction, to both sides of which the positive electrode mixture is not applied and along that the aluminum foil is accordingly exposed, constitutes a positive electrode mixture untreated portion 11c that is not treated with the positive electrode mixture. A large number of positive leads 16 are formed integrally at regular intervals upon this positive electrode mixture untreated portion 11c, and project upwards parallel to the winding core 15.

The positive electrode mixture consists of an active positive electrode material, an electrically conductive positive electrode material, and a positive electrode binder. The active positive electrode material is desirably a lithium metal oxide or a lithium transitional metal oxide. For example, lithium cobalt oxide, lithium manganate, lithium nickel oxide, or a compound lithium metal oxide (that includes two or more sorts of lithium metal oxides selected from the lithium metal oxides based on cobalt, nickel, and manganese) may be suggested. The electrically conductive positive electrode material is not particularly limited, provided that it is a substance that can assist transmission to the positive electrode of electrons that are generated in the positive electrode mixture by a lithium occlusion/emission reaction. As examples of a material for this electrically conductive positive electrode mixture, graphite or acetylene black or the like may be suggested. It should be noted that the above mentioned compound lithium metal oxide including transitional metal components may also be used as a conductive positive electrode material, since it has a conductivity.

The positive electrode binder holds together the active positive electrode material and the electrically conductive positive electrode material, and also is capable of adhering together the layer of positive electrode mixture 11b and the positive electrode sheet 11a, and is not particularly limited, provide that it is not greatly deteriorated by contact with the non-aqueous electrolyte. As an example of a material for this positive electrode binder, polyvinylidene fluoride (PVDF) or fluorine-containing rubber or the like may be suggested. The method of making the positive electrode mixture layer 11b is not particularly limited, provided that it is a method of forming the layer of positive electrode mixture upon the positive electrode. As an example of a method for making a layer the positive electrode mixture 11b, the method may be suggested of applying, onto the positive electrode sheet 11a, a solution in which the substances that make up the positive electrode mixture are dispersed.

As a method for applying the positive electrode mixture to the positive electrode sheet 11a, a roll coating method, a slit die coating method or the like may be suggested. As a solvent for the solution in which the positive electrode mixture is to be dispersed, for example, it may be added to N-methylpyrrolidone (NMP) or water or the like and kneaded into a slurry, that is then applied uniformly to both sides of an aluminum foil of thickness, for example, 20 μm; and, after drying, this may be cut up by stamping. The positive electrode mixture may be applied, for example, to a thickness of around 40 μm on each side. When the positive electrode sheet 11a is cut out by stamping, the positive leads 16 are formed integrally therewith at the same time.

The negative electrode 12 is made from copper foil and has an elongated shape, and includes a negative electrode sheet 12a and a processed negative electrode portion in which a negative electrode mixture is applied to form a layer 12b on both sides of this negative electrode sheet 12a. Both sides of the lower side edge of the negative electrode sheet 12a along the longitudinal direction, to which the negative electrode mixture is not applied and along which the copper foil is accordingly exposed, constitute a negative electrode mixture untreated portion 12c that is not treated with the negative electrode mixture. A large number of negative leads 17 are formed integrally at regular intervals upon this negative electrode mixture untreated portion 12c, and project downwards in the direction opposite to that in which the positive leads 16 project.

The negative electrode mixture consists of an active negative electrode material, a negative electrode binder, and a thickener. This negative electrode mixture may also include an electrically conductive negative electrode material such as acetylene black or the like. It is desirable to use graphitic carbon as the active negative electrode material. By using graphitic carbon, it is possible to manufacture a lithium ion secondary battery cell that is suitable for a plug-in hybrid vehicle or electric vehicle, for which high capacity is demanded. The method for forming a layer of the negative electrode mixture 12b is not particularly limited, provided that it is a method that can form a layer of the negative electrode mixture 12b upon the negative electrode sheet 12a. As a method for applying the negative electrode mixture to the negative electrode sheet 12a, for example, the method may be suggested of applying upon the negative electrode sheet 12a a solution in which the constituent substances of the negative electrode mixture are dispersed. As the method for application, for example, a roll coating method, a slit die coating method or the like may be suggested.

As a method for applying the negative electrode mixture to the negative electrode sheet 12a, for example, N-methyl-2-pyrrolidone or water may be added to the negative electrode mixture as a dispersal solvent and kneaded into a slurry, that is then applied uniformly to both sides of a rolled copper foil of thickness, for example, 10 μm; and, after drying, this may be cut up by stamping. The negative electrode mixture may be applied, for example, to a thickness of around 40 μm on each side. When the negative electrode sheet 12a is cut out by stamping, the negative leads 17 are formed integrally therewith at the same time.

If the widths of the first separator 13 and of the second separator 14 are termed WS, the width of the layer of negative electrode mixture 12b that is formed upon the negative electrode sheet 12a is termed WC, and the width of the layer of positive electrode mixture 11b that is formed upon the positive electrode sheet 11a is termed WA, then the manufacturing process is performed so that the following equation is satisfied:

$$WS > WC > WA \qquad \text{(refer to FIG. 3)}$$

In other words, the width WC of the layer of negative electrode mixture 12b is always greater than the width WA of the layer of positive electrode mixture 11b. This is done because, in the case of a lithium ion secondary battery cell, when the lithium that is the active positive electrode material is ionized and permeates the separator, if there is some portion on the negative electrode sheet 12a at which the layer of active negative electrode material 12b is not formed so that the negative electrode sheet 12a is exposed to the layer of active positive electrode material 11b, then the lithium therein will be deposited upon the negative electrode sheet 12a, and this can cause an internal short circuit to occur.

Referring to FIGS. 1 and 3, a stepped portion 15a with a diameter larger than the inner diameter of the winding core 15 is formed on the inner surface of the hollow cylindrical shaped winding core 15 at its upper end portion in the axial direction (the vertical direction in the drawing), and a positive electrode current collecting member 31 is pressed into this stepped portion 15a. This positive electrode current collecting member 31 may, for example, be made from aluminum, and includes a circular disk shaped base portion 31a, a lower top portion 31b that projects to face towards the winding core 15 at the surface of this base portion 31a facing the electrode group 10 and that is pressed over the inner surface of the stepped portion 15a, and an upper cylinder portion 31c that projects out towards the sealing lid 50 at the peripheral edge portion of the outer circumferential portion of the base portion 31a. An aperture 31d is formed at the base portion 31a of the positive electrode current collecting member 31, for allowing the escape of gas generated in the interior of the battery cell. It should be noted that the winding core 15 is made of such a material that isolates electrically between the positive electrode current collecting member 31 and the negative electrode current collecting member 21, and that also keeps the axial rigidity of the battery cell. In the present embodiment, for example, as the material for the winding core 15, a glass-fiber reinforced polypropylene is employed.

All of the positive leads 16 of the positive electrode sheet 11a are welded to the upper cylinder portion 31c of the positive electrode current collecting member 31. In this case, as shown in FIG. 2, the positive leads 16 are overlapped over one another and joined upon the upper cylinder portion 31c of the positive electrode current collecting member 31. Since each of these positive leads 16 is very thin, accordingly it is not possible for a large electrical current to be taken out by just one of them. Due to this, the large number of positive leads 16 are formed at predetermined intervals over the total length of the upper edge of the positive electrode sheet 11a from the start of its winding onto the winding core 15 to the end of that winding.

The positive leads 16 of the positive electrode sheet 11a and an annular pressure member 32 are welded to the external periphery of the upper cylinder portion 31c of the positive electrode current collecting member 31. The large number of positive leads 16 are closely clamped against the external peripheral surface of the upper cylinder portion 31c of the positive electrode current collecting member 31, the pressure member 32 is wound over the externally oriented surfaces of the positive leads 16 and temporarily fixed there, and then they are all welded together in that state.

Since the positive electrode current collecting member 31 is oxidized by the electrolyte, its reliability can be enhanced by making it from aluminum. When the aluminum on the front surface is exposed by any type of processing, immediately a coating of aluminum oxide is formed upon that front surface, so that it is possible for oxidization by the electrolyte to be prevented due to this layer of aluminum oxide. Moreover, by making the positive electrode current collecting member 31 from aluminum, it becomes possible to weld the positive leads 16 of the positive electrode sheet 11a thereto by ultrasonic welding or spot welding or the like.

A stepped portion 15b whose outer diameter is smaller than the outer diameter of the winding core 15 is formed upon the external peripheral surface of the lower end portion of the winding core 15, and a negative electrode current collecting member 21 is pressed over this stepped portion 15b and thereby fixed thereto. This negative electrode current collecting member 21 may, for example, be made from copper, and is formed with a circular disk shaped portion 21a and with an opening portion 21b that is formed in the disk shaped portion 21a and pressed over the stepped portion 15b of the winding core 15; and, on its outer peripheral edge, an external circumferential cylinder portion 21c is formed so as to project outwards in the bottom portion of the battery cell container 2.

All of the negative leads 17 of the negative electrode sheet 12a are welded to the external circumferential cylinder portion 21c of the negative electrode current collecting member 21 by ultrasonic welding or the like. Since each of these negative leads 17 is very thin, in order to take out a large electrical current, a large number of them are formed over total length of the lower edge of the negative electrode sheet 12a from the start of its winding onto the winding core 15 to the end of its winding, at predetermined intervals.

The negative leads 17 of the negative electrode sheet 12a and the annular pressure member 22 are welded to the external periphery of the external circumferential cylinder portion 21c of the negative electrode current collecting member 21. The large number of negative leads 17 are closely clamped against the external peripheral surface of the external circumferential cylinder portion 31c of the negative electrode current collecting member 21, the pressure member 22 is wound over the externally oriented surfaces of the negative leads 17 and temporarily fixed there, and then they are all welded together in that state.

A negative electrode power lead 23 that is made from copper is welded to the lower surface of the negative electrode current collecting member 21. This negative electrode power lead 23 is welded to the bottom portion of the battery cell container 2. The battery cell container 2 may, for example, be made from carbon steel of thickness 0.5 mm, and its surface is processed by nickel plating. By using this type of material, it is possible to weld the negative electrode power lead 23 to the battery cell container 2 by resistance welding or the like.

The one end portion of a flexible electrically conducting positive electrode lead 33 that is made by laminating together a plurality of layers of aluminum foil is joined to the upper surface of the base portion 31a of the positive electrode current collecting member 31 by welding. Since this conducting positive electrode lead 33 is made by laminating together and integrating a plurality of layers of aluminum foil, accordingly it is capable of carrying a large electrical current, and moreover it is endowed with flexibility. In other words, while it is necessary to make the thickness of the connection member great in order for it to conduct a high electrical current, if it were to be made from a single metallic plate, its rigidity would become high, and it would lose its flexibility. Accordingly this connection member is made by laminating together a large number of sheets of aluminum foil of low thickness, thus preserving its flexibility. The thickness of the conducting positive electrode lead 33 may, for example, be 0.5 mm, and it may be made by laminating together 5 sheets of aluminum foil each of thickness 0.1 mm.

As explained above, by the large number of positive leads 16 being welded to the positive electrode current collecting member 31 and the large number of negative leads 17 being welded to the negative electrode current collecting member 21, the positive electrode current collecting member 31, the negative electrode current collecting member 21, and the electrode group 10 are integrated together into the generating unit 20 (refer to FIG. 2). However, in FIG. 2, for the convenience of illustration, the negative electrode current collecting member 21, the pressure member 22, and the negative electrode power lead 23 are shown as separated from the generating unit 20.

The Sealing Lid 50

The details of the sealing lid 50 will now be explained with reference to FIGS. 1, 2, and 4 through 6.

Figure 4:
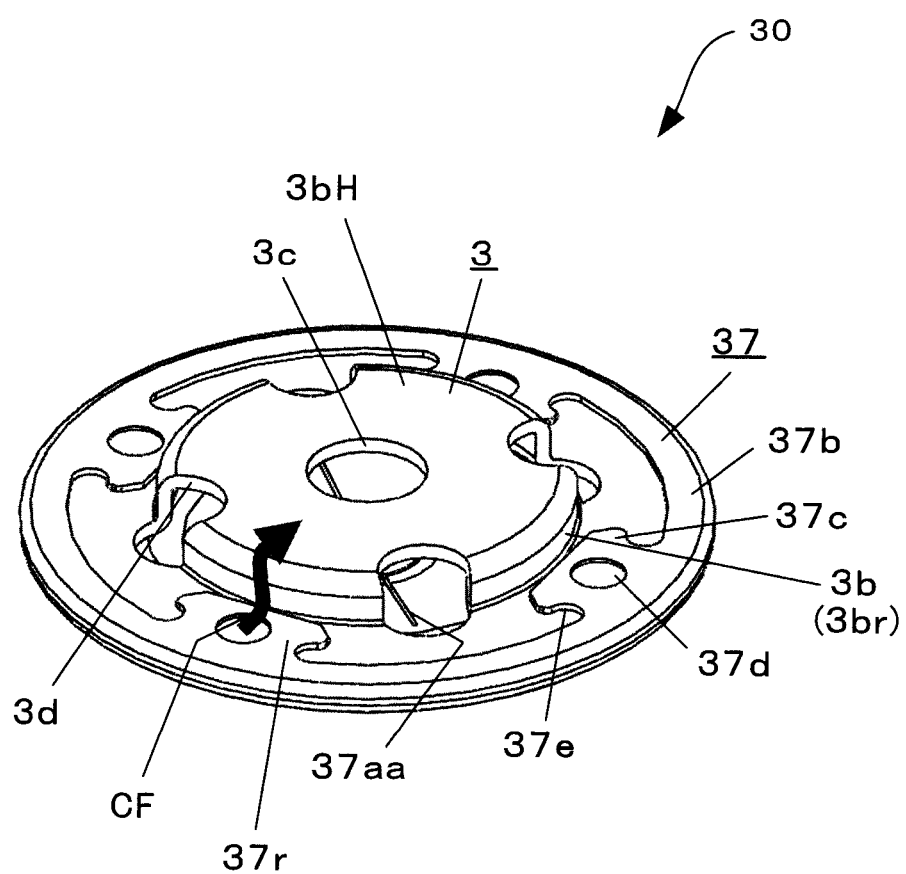
FIG. 4 is a perspective view showing a sealing lid of FIG. 1.

This sealing lid 50 is assembled in advance as a sub-assembly, and includes a cap 3 that has exhaust apertures 3c and 3d, a cap casing 37 in which the cap 3 is installed and cleavage grooves 37a, 37aa are provided, a positive electrode connection plate 35 that is spot welded to the central portion of the rear surface of the cap casing 37, and an insulation ring 41 that is sandwiched between the border of the upper surface of the positive electrode connection plate 35 and the rear surface of the cap casing 37 (see FIGS. 1, 2, 4).

The cap 3 is made by performing nickel plating upon iron such as carbon steel or the like. The cap 3 includes a peripheral part (i.e. an annular portion) 3a that is shaped as a circular disk, and a top portion 3b that projects upwards from this peripheral part 3a, and that has the overall form of a hat. An aperture 3c is formed in the center of the upper base portion 3bH of the top portion 3b, and four apertures 3d are provided at predetermined intervals around its side wall. These apertures 3c and 3d are for venting gas to the exterior of the battery cell, when due to the pressure of gas generated interior to the battery cell the diaphragm 37 cleaves and opens. The top portion 3b functions as an external positive electrode terminal, and a bus bar or the like from outside the battery cell is connected thereto.

The process of manufacturing the cap 3 includes a process of forming a hat shape with the top portion 3b that projects outwards from the battery cell and the annular portion 3a, and a process of providing the plurality of apertures 3d for venting gas, arranged at predetermined intervals on the side wall of the top portion 3b.

The peripheral part of the cap 3 is integrated with a folded back flange 37b of the cap casing 37, that is made from aluminum alloy. In other words, the border of the flat plate shaped raw material of the cap casing 37 is folded back to the upper surface of the cap 3 along its circumferential edge, and is fixed to the cap 3 by swaging. And on the circular annular region of the cap casing 37 that is folded back to the upper surface of the cap 3, in other words on its flange 37b, four tags 37c that project for welding are provided at intervals of 90° apart. These four projecting tags 37c are friction stir welded to the cap 3. in other words, the cap casing 37 and the cap 3 are fixed together by the flange 37b that is swaged, and then the projecting tags 37c are welded to create an integrated structure.

The process of integrating together the cap 3 and the cap casing 37 includes the following processes: a process of fixing by swaging the border of the cap casing 37, which is folded back, to the edge of the upper surface of the annular portion of the cap 3; a process of welding together the cap 3 and the cap casing 37 at this folded back border region; and a process, before the process of fixing by swaging process, of adjusting the mutual positions of the cap 3 and the cap casing 37 so that the projecting tags 37c for welding face the side wall of the top portion 3b of the cap 3 between pairs of the mutually adjacent gas venting apertures 3d that are provided in the side wall of the top portion 3b.

A circular shaped cleavage groove 37a and cleavage grooves 37aa that extend radially in four directions from this circular cleavage groove 37a are formed upon the central circular region of the cap casing 37. These cleavage grooves 37a and 37aa are made by press forming to have V-shapes in its cross-sections on the upper side of the cap casing 37, thus having a thinned wall at the bottom of a groove. When the internal gas pressure within the battery cell container 2 rises to higher than some predetermined threshold value, these cleavage grooves 37a and 37aa burst and open, so that the gas inside the container 2 is vented to the exterior.

Figure 5:
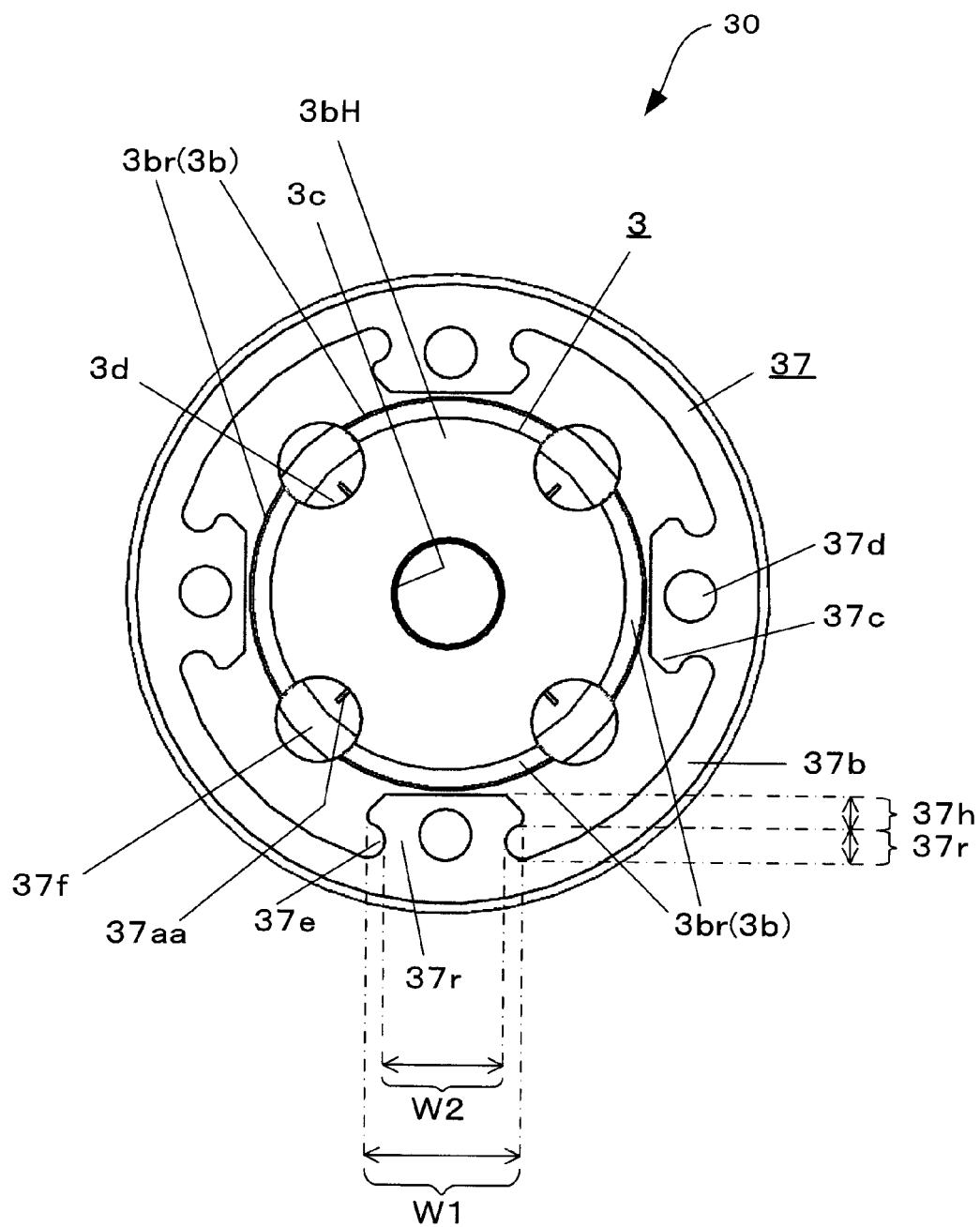
FIG. 5 is a plan view showing the sealing lid of FIG. 4.
Figure 6:
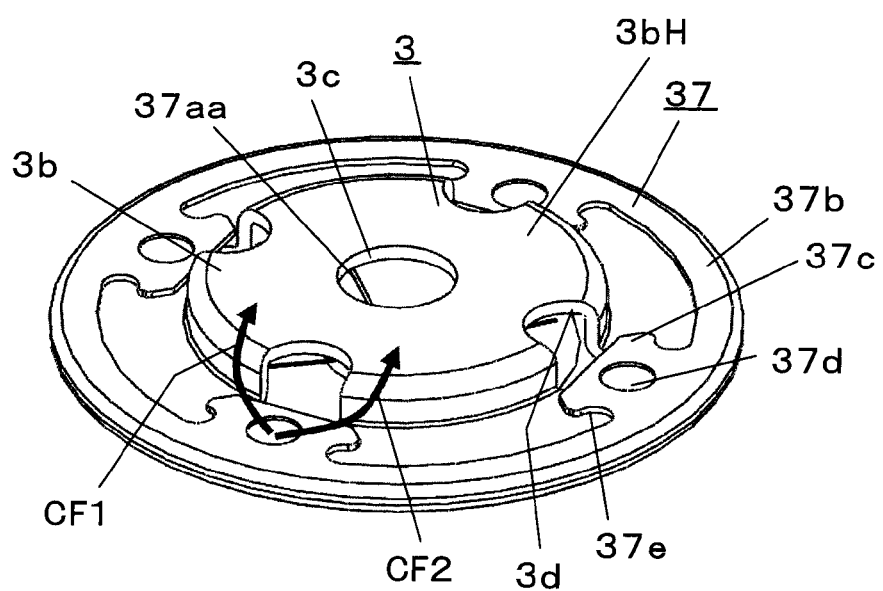
FIG. 6 is a perspective view showing a sealing lid of a comparison example.

As shown in FIGS. 5 and 6, the projecting tags 37c have link portions 37r that join to the flange 37b and widened portions 37h that are provided as joined to the link portions 37r, and they are formed as approximate letter-T shapes that are symmetrical left and right. If the width of the widened portions (i.e. the tip end portions) 37h in the circumferential direction is termed W1 and the width of the link portions 37r in the circumferential direction is termed W2, then W1>W2. The link portions 37r of width W2, for example, may be formed by making notches 37e of approximately semicircular shapes in the link portions between the projecting tags 37c and the flange 37b. Circular regions 37d at almost the central portions of the widened portions 37h are friction stir welding portions. The circular regions 37d are slightly sagged in form by applying the friction stir welding, which is due to the geometry of a rotating tool (described later) used in the friction stir welding.

In this embodiment, the nickel plating layer of the cap 3 and the projecting tags 37c of the cap casing 37 that is made from aluminum alloy are joined together by friction stir welding. By the cap 3 and the cap casing 37 being connected together by welding, the electrical resistance between them becomes sufficiently low. Moreover, it is arranged to project the projecting tags 37c from the flange 37b, and to weld them over a sufficiently broad area. By employing this type of structure, it is possible to reduce the electrical resistance, as compared to the case of installing the cap casing 37 to the cap 3 only by a swaging process.

It should be understood that, if the cap 3 is made from iron, then, when connecting it in series to other cylindrical type secondary battery cells, it will be possible to connect it to a neighboring cylindrical type secondary battery cell that is also made from iron by spot welding.

The sealing lid 50 constitutes an anti-explosion mechanism. When, due to gas that is generated in the interior of the battery cell container 2, its internal pressure rises to higher than a reference value, then cracking of the cap casing 37 takes place at the cleavage grooves 37a and 37aa, and the internal gas is vented from the exhaust apertures 3c and 3d, so that the pressure within the battery cell container 2 drops. Furthermore, due to the internal pressure in the battery cell container 2, the cap casing 37, which is also called as diaphragm, bulges outwards from the vessel, so that the electrical connection to the positive electrode connection plate 35 is interrupted, and this blocks thereafter any electrical current flow.

The sealing lid 50 is mounted upon the upper cylinder portion 31c of the positive electrode current collecting member 31 in an insulated state. In other words, the cap casing 37 to which the cap 3 has been integrated is mounted upon the upper end surface of the positive electrode current collecting member 31 via the insulation ring 41, thus being in an insulated state. However, the cap casing 37 is electrically connected to the positive electrode current collecting member 31 by the conducting positive electrode lead 33, so that the cap 3 of the sealing lid 50 constitutes the positive electrode of this battery cell 1. Here, the insulation ring 41 has an opening portion 41a (refer to FIG. 2) and a side portion 41b that projects downwards. The connection plate 35 is fitted into this opening portion 41 a of the insulation ring 41.

The connection plate 35 is made from aluminum alloy, and is almost entirely uniform except for its central portion; moreover, it has an almost dish-shaped form, with its center being sagged to a slightly lower position. The thickness of this connection plate 35 may, for example, be about 1 mm. A projecting portion 35a is formed at the center of the connection plate 35 in a low dome shape, and a plurality of apertures 35b are formed around this projecting portion 35 (refer to FIG. 2). These apertures 35b are endowed with the function of emitting gas that is generated in the interior of the battery cell. The projecting portion 35a of the connection plate 53 is joined to the bottom surface of the central portion of the cap casing 37 by low resistance welding or friction stir welding.

With the sealed battery cell according to this embodiment, the phase angle between the cap casing 37 and the cap 3 is determined so that the projecting tags 37c of the cap casing 37 are positioned to face substantially the centers of the side wall regions 3br between the four side wall apertures 3d of the cap 3. In other words, the portions for welding 37d of the projecting tags for welding 37c are positioned to face substantially the centers of the side wall regions 3br between pairs of the apertures 3d. To put it in another manner, the cap 3 is swaged to the cap casing 37 so that the side walls between adjacent pairs of the side wall apertures 37d and the projecting tags 37c confront one another. Or, the positional relationship between the projecting tags 37c and furthermore by extension their portions for welding 37d, and the apertures 3d, is regulated so that the apertures 3d do not lie upon the lines that connect the portions for welding 37d to the center of the cap 3. It should be noted that, naturally, the distance between a portion for welding 37d and a corresponding sidewall region 3br is substantially same for the above explained 4 pairs of a portion for welding 37d and a corresponding side wall region 3br.

As described above, the head portion 3bH (refer to FIG. 4) of the top portion 3b of the cap 3 functions as the external positive electrode terminal, and charging current and discharge current flow between the positive electrode current collecting member 31 of the generating unit 20 and the sealing lid 50. In FIG. 4, the discharge current path from one of the portions for welding 37d to the top portion 3b is schematically shown by the thick arrow.

Figure 12:
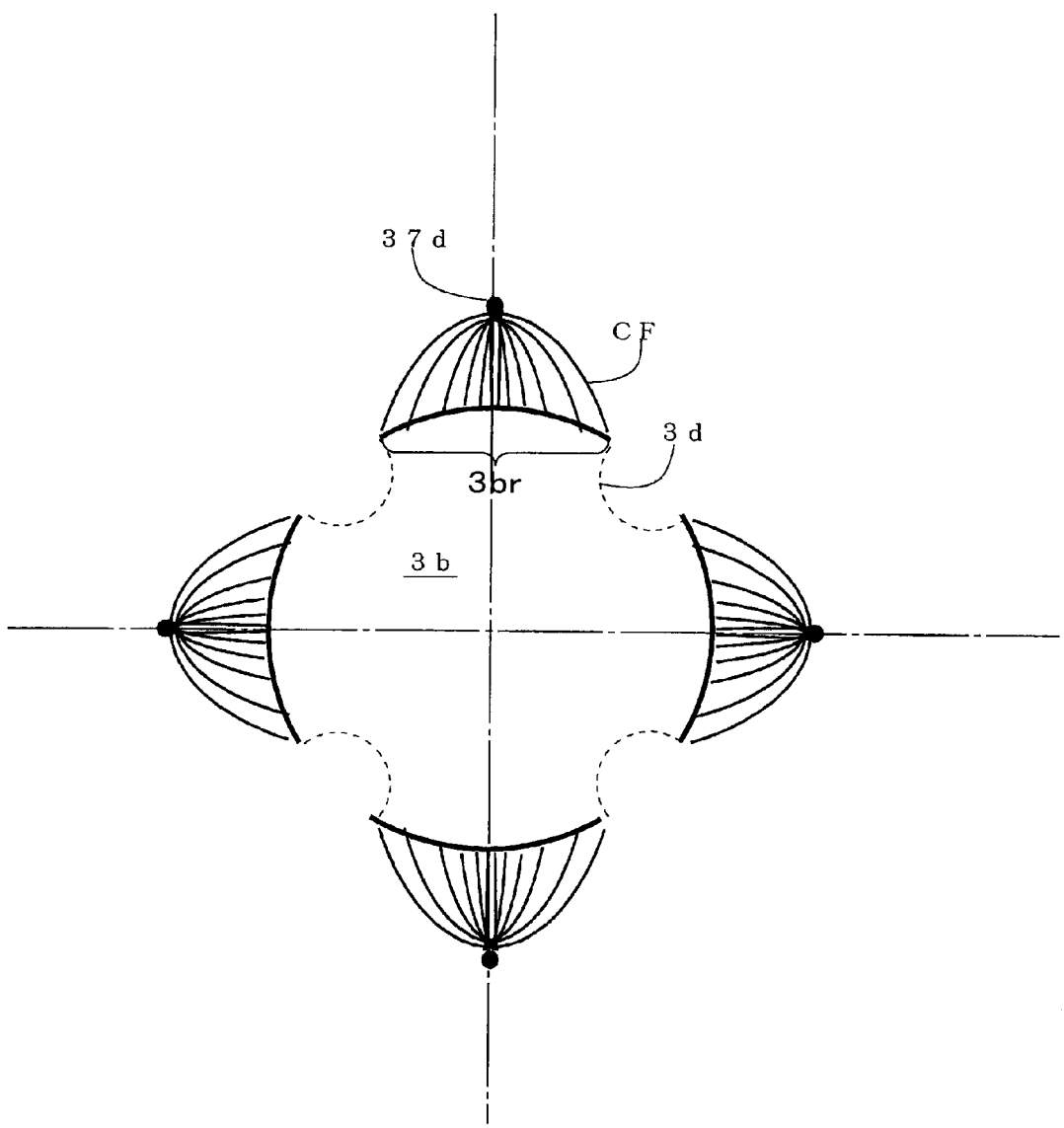
FIG. 12 is a figure conceptually showing the paths for current flow with the sealing lid of this embodiment.
Figure 13:
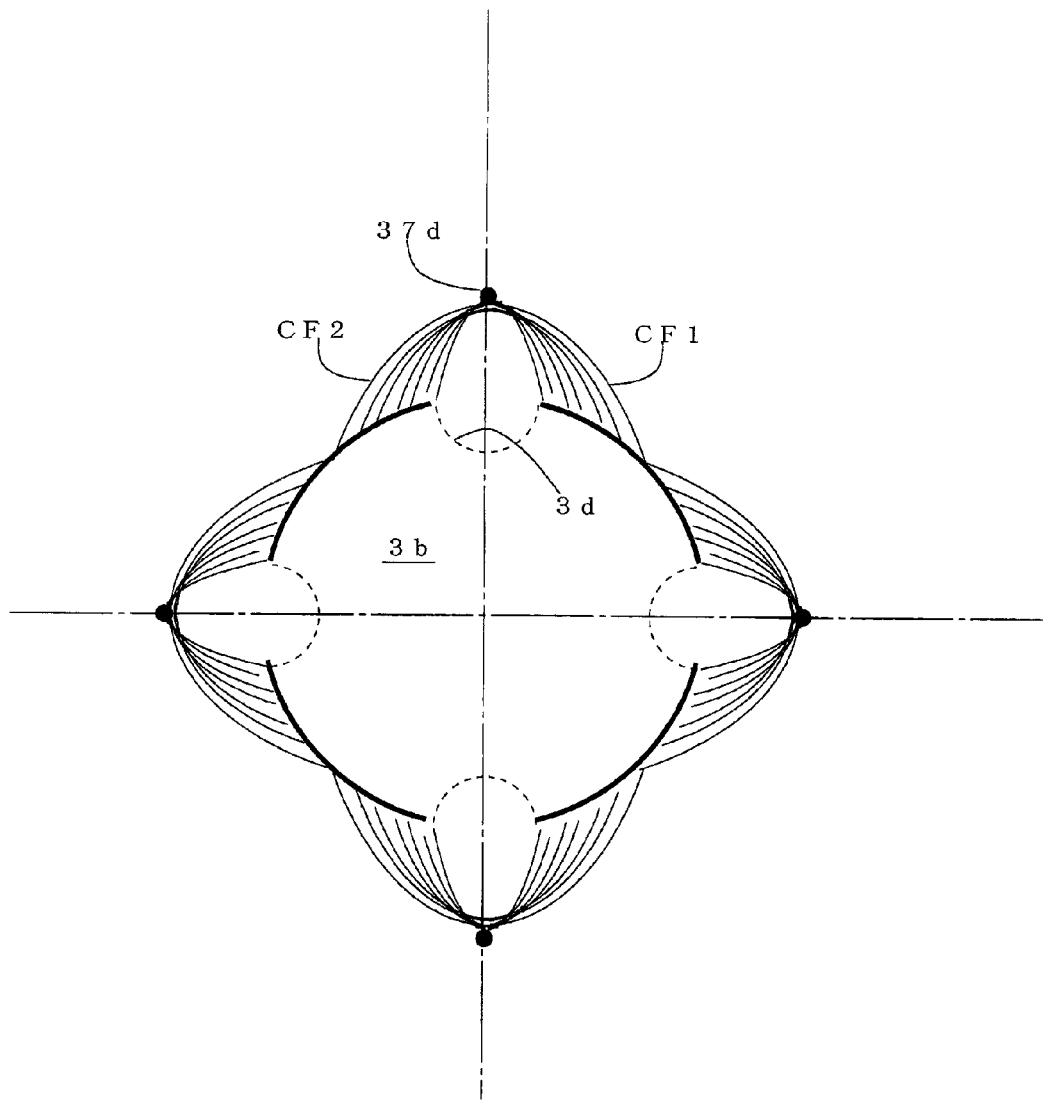
FIG. 13 is a figure conceptually showing the paths for current flow with a sealing lid of a comparison example.

FIG. 12 is a figure for schematically explaining the electrical current path between the portions for welding 37d and the top portion 3b. In FIG. 12, a plurality of current paths CF are shown between the portions for welding 37d, shown by the black dots, and the top portion 3b, shown by the thick line segments. In other words, the electrical current flows substantially equally between the top portion 3b and the four portions for welding 37d. Accordingly, the substantially symmetrical electrical current flowing areas are defined between the side wall regions 3br of the top portion that are located between adjacent pairs of the apertures 3d and the portions for welding 37 that are facing to these side wall regions 3br.

When as described above the cap 3 and the cap casing 37 are fixed together and swaged, the current paths between the portions for welding 37d and the cap 3 are not divided by the apertures 3d. Furthermore since, in this embodiment, four of the portions for welding 37d and four of the apertures 3d are provided, so that the symmetrical and also continuous paths CF for flow of electrical current are defined, accordingly the lengths of the current flow paths become short, and moreover the influence upon disturbance of the current flow paths due to the apertures 3d becomes a minimum. As a result, it is possible to reduce the electrical resistance of the charging and discharging current paths within the sealing lid 50 to a minimum.

Moreover, while the details will be described hereinafter, the electrode group 10 is contained within the battery cell container 2, and the sealing lid 50, that has been manufactured as a part-assembly in advance, is electrically connected to the positive electrode current collecting member 31 by the conducting positive electrode lead 33, and is mounted inside the cell container 2 on the groove 2a of the cell container 2. And the external circumferential wall portion 43b of the gasket 43 is folded by pressure or the like, and is processed by swaging so that it is pressed in the axial direction the sealing lid 50 is held by the base portion 43a and the external circumferential wall portion 43b. Due to this, the sealing lid 50 is fixed to the battery cell container 2 via the gasket 43.

Initially, as shown in FIG. 2, the gasket 43 has a shape that includes the external circumferential wall portion 43b that is formed to rise almost vertically upwards on the circumferential side edge of the annular base portion 43a, and, on the internal circumference of the annular base portion 43a, a cylinder portion 43c that is formed to drop almost vertically downwards from the base portion 43a. And, by the battery cell container 2 being swaged, the sealing lid 50 is sandwiched by the external circumferential wall portion 43b.

A predetermined amount of a non-aqueous electrolyte is injected into the interior of the battery cell container 2. A solution of a lithium salt dissolved in a carbonate series solvent is a preferred example of such a non-aqueous electrolyte that may be used. Examples that may be cited of lithium salts are lithium hexafluorophosphate (LiPF6), lithium tetrafluoroborate (LiBF4), and so on. Furthermore, examples that may be cited of carbonate series solvents are ethylene carbonate (EC), dimethyl carbonate (DMC), propylene carbonate (PC), methyl-ethyl carbonate (MEC), mixtures of two or more solvents selected from the above, and so on.

This sealed battery cell according to this embodiment can confer the following operational advantages.

(1) The portions for welding 37d in the projecting tags for welding 37c are positioned between the pairs of apertures 3d. To put it in another manner, the cap 3 is swaged to the cap casing 37 so that the side walls between adjacent pairs of the side wall apertures 3d and the projecting tags 37c confront one another. By doing this, the positional relationship between the apertures 3d and the portions for welding 37d is regulated so that paths for electrical current are defined continuously from the portions for welding 37d towards the center of the cap 3. Moreover, the positional relationship between the portions for welding 37d and the apertures 3d is regulated so that the apertures 3d are not located upon the straight lines that join together the portions for welding 37d and the cap 3. Accordingly, it is possible to make the paths within the sealing lid for current charging and discharging simpler, it is possible to reduce the electrical resistance, and moreover it is possible to produce a more stable manufactured product.

(2) Since the projecting tags 37c are provided to protrude from the flange 37b of the cap casing 37, and this projecting tags 37c are welded to the cap 3, accordingly it is possible to ensure a wider welding area than in the prior art, and also, from this viewpoint as well, it is possible to reduce the resistance of the electrical current path provided by the sealing lid 50. Accordingly, it is possible to reduce the resistance value of the sealing lid of the sealed battery cell of this embodiment to an extremely low level.

(3) In these projecting tags 37c, the larger widened portions 37h of substantially increased area are provided at their end portions, and it is arranged for these widened portions 37h to be linked to the flange 37b via the narrow link portions 37r whose width in the circumferential direction is narrowed down. These link portions 37r are made to have relatively low rigidity against plastic deformation, and, due to this, when the flange 37b and the projecting tags 37c are folded along the upper surface of the cap 3, no damage is caused apart from deformation of the flange 37b. Accordingly, it is possible to avoid problems such as decrease of the sealing performance of the sealing lid and so on.

Supplementary explanation will now be provided for certain operational advantages and so on of the lithium secondary battery cell 1 according to this embodiment.

(4) With the lithium secondary battery cell 1 of this embodiment, friction stir welding is performed upon the projecting tags 37c that project from the flange 37b (i.e. from the swaged portion) at which the cap casing 37 and the cap 3 are swaged. In this friction stir welding, by pressing the tip end portion of a rotating tool against the projecting tags 37c while rotating it, the projecting tags 37c that are parts of the cap casing 37 and portions of the upper surface of the cap 3 are caused to flow plastically due to the frictional heat that is engendered, and the material that makes them up is mixed together so as to be integrated. Due to this it is possible to reduce the electrical resistance between the cap casing 37 and the cap 3 when current flows, since there are no surfaces of contact of dissimilar metals at the integrated welded portions between the cap casing 37 and the cap 3.

(5) With the lithium secondary battery cell 1 of this embodiment, joining by friction stir welding is performed at four spots upon the projecting tags 37c. Furthermore, the size of the projecting tags 37c may be made as large as possible in order to optimize the connecting areas, and the necked link portions 37r are provided at the mounting roots of the projecting tags 37c, in order to reduce malfunctioning during the swaging process. Since, due to this, it is possible to ensure large welded portions, and it is also possible to suppress increase of the electrical resistance because the generated heat may smoothly dissipated even when a high current is being discharged, accordingly it is possible to alleviate loss of electrical power when a high current is being discharged.

(6) With the lithium secondary battery cell 1 of this embodiment, the friction stir welding of the projecting tags 37c is performed by pressing a rotating tool to contact with the projecting tags 37c that project from the flange 37b of the cap casing 37 that is folded back to the upper side of the cap 3. Due to this, it is possible to prevent the formation of pinholes and the like during the welding upon the lower surface of the cap casing 37 that is positioned internally in the battery cell after assembly of the battery cell. And since with this lithium secondary battery cell 1, because of the above, the non-aqueous electrolyte does not contact the cap 3 so that corrosion is prevented, accordingly it is possible to prevent leakage of the non-aqueous electrolyte, and it is thus possible to prevent damage occurring to surrounding equipment and so on. Accordingly this lithium secondary battery cell 1, with which loss of electrical power during discharge of a high electrical current is alleviated and also leakage of the non-aqueous electrolyte is prevented, is a battery cell for which the reliability of the junction between the cap casing 37 of the sealing lid 50 and the cap 3 is enhanced.

(7) Since, with the lithium secondary battery cell 1 of this embodiment, the material of the positive electrode connection plate 35 of the cap casing 37 has a lower melting point than the material of the cap 3 due to their physical parameters, accordingly it is possible to join the positive electrode connection plate 35 of the cap casing 37 and the conducting positive electrode lead 33 by welding them together in a simple and easy manner. Moreover, since the cap 3 has a higher melting point than that of the cap casing 37, accordingly it is possible to suppress deformation and so on during use when the battery cell is being used during a temperature increase or in a high temperature environment.

With a prior art type lithium secondary battery cell, spot welding has been used for joining a lid case (i.e. a cap casing) included in the sealing lid to a lid cap (i.e. a cap). Since, with spot welding, joining is performed by contacting a welding electrode against the lower surface of a flange portion of the lid case and the upper surface of a flange portion of the lid cap, and by passing a current through the electrode, accordingly sometimes it happens that defects such as pinholes or the like are created in the lower surface of the lid case that is made from aluminum whose melting point is lower than that of the iron of the lid cap, or that welding traces remain. Since it is difficult for pinholes or the like to be created in the lid cap that is made from iron even if pinholes or the like are created in the lid case that is made from aluminum, accordingly it is not possible to detect such pinholes in the lid case even if an airtightness test is performed upon the battery cell lid. And, since the lower surface of the lid case comes to be inside the battery cell after assembly of the battery cell, accordingly the non-aqueous electrolyte penetrates into the pinholes, because the lower surface of the lid case is exposed to the non-aqueous electrolyte. Due to this, the lid cap corrodes because the non-aqueous electrolyte that has penetrated into the pinholes comes into contact with the lid cap that is made from iron, and then the non-aqueous electrolyte may leak. Such non-aqueous electrolyte that has leaked out from the battery cell to the exterior not only may damage this battery cell itself, but also there is a fear that, if for example this battery cell is assembled into a battery of battery cells, it may cause damage such as corrosion or the like to neighboring battery cells, or that it may cause damage to nearby equipment. On the other hand, since the types of the metals of the lid case and the lid cap are different, accordingly a contact resistance is present against the sealing lid due to these two dissimilar metals. Due to this, a loss of electrical power takes place due to high current discharge. With an assembled battery in which a large number of battery cells are connected, this electrical power loss becomes large because the overall resistance becomes large. However, this embodiment of the present invention is a lithium secondary battery cell for high discharge current, that is capable of resolving these problems.

Method of Manufacturing This Sealed Battery Cell

When manufacturing this sealed battery cell 1, first, the positive electrode 11 is manufactured by forming the layer of positive electrode mixture 11b and the positive electrode mixture untreated portion 11c on both sides of the positive electrode sheet 11a, and by forming the large number of positive leads 16 integrally with the positive electrode sheet 11a. Furthermore, the negative electrode 12 is manufactured by forming the layer of negative electrode mixture 12b and the processed negative electrode portion 12c on both sides of the negative electrode sheet 12a, and by forming the large number of negative leads 17 integrally with the negative electrode sheet 12a.

And, as shown in FIG. 12, the electrode group 10 is manufactured by winding the first separator 13, the positive electrode 11, the second separator 14, and the negative electrode 12 upon the winding core 15 in that order. In this case, if the innermost edge portions of the first separator 13, the positive electrode 11, the second separator 14, and the negative electrode 12 are welded to the winding core, then, during the winding process, it is simple and easy to coil them up against the resistance of the imposed load.

Then the negative electrode current collecting member 21 is fitted onto the lower portion of the winding core 15 of this electrode group 10. This fitting of the negative electrode current collecting member 21 is performed by fitting the opening portion 21b of the negative electrode current collecting member 21 over the stepped portion 15b provided upon the lower end portion of the winding core 15. Next, the negative leads 17 are put into close contact with the external circumference of the external circumferential cylinder portion 21c of the negative electrode current collecting member 21 while being distributed almost evenly therealong, and the pressure ring member 22 is fitted over the outside of the negative leads 17. And the negative leads 17 and the pressure ring 22 are welded to the negative electrode current collecting member 21 by ultrasonic welding or the like. Then, the negative electrode power lead 23 is welded to the negative electrode current collecting member 21, so as to straddle the lower end surface of the winding core 15 and the negative electrode current collecting member 21.

Next, the lower cylinder portion 31b of the positive electrode current collecting member 31 of the winding core 15 is fitted into the groove 15a that is provided at the upper end of the winding core 15. And the positive leads 16 of the positive electrode 11 are closely contacted to the outer surface of the upper cylinder portion 31c of the positive electrode current collecting member 31 while being distributed almost evenly therealong. Then the pressure member 32 is fitted around the external sides of the positive leads 16, and, using ultrasonic welding or the like, the positive leads 16 and the pressure ring 32 are welded to the upper cylinder portion 31c of the positive electrode current collecting member 31. This completes the manufacture of the generating unit 20.

Next, the generating unit 20 that has been made according to the process described above is fitted into a cylindrical member that is made from metal and has a bottom, and that is of a size that can contain the generating unit 20. This cylinder member that has a bottom will become the battery cell container 2. In the following, in order to simplify and clarify the explanation, this cylinder member that has a bottom will be described as being the battery cell container 2.

The negative electrode power lead 23 of the generating unit 20 that has thus been housed within the battery cell container 2 is now welded to the battery cell container 2 by resistance welding or the like. Although this technique is not shown in the drawings, in this case, a welding electrode rod is inserted from the outside of the battery cell container 2 into the hollow central axis of the winding core 15, and the negative electrode power lead 22 is pushed against the bottom portion of the battery cell container 2 by this electrode rod and is then welded there by the supply of electrical current.

Next, a portion of the battery cell container 2 at its upper end portion is pushed radially inwards by a drawing process, so that the almost letter-V shaped groove 2a is formed upon the outer surface of the battery cell container 2. This groove 2a in the battery cell container 2 is formed so as to be axially positioned at the upper end portion of the generating unit 20, or, to put it in another manner, is formed so as to be positioned in the neighborhood of the upper end of the positive electrode current collecting member 31. A predetermined amount of an appropriate non-aqueous electrolyte is injected into the interior of the battery cell container 2, in which the generating unit 20 is held.

Manufacture of the Cap Casing 37

FIGS. 8 through 11 show the process for manufacturing the cap casing 37.

In the state before swaging, the plurality of projecting tags 37c are provided on the flange 37b of the cap casing 37 so as to project upwards from the outer edge of its flange 37b. When the flange 37b has been swaged so as to follow the upper surface of the cap 3, the projecting tags 37c project along the edge of the upper surface of the cap 3, facing from the flange 37b towards the center of the cap 3. The cap casing 37 is then welded to the cap 3 by friction stir welding, at the portions for welding 37d that are at the approximate centers of the projecting tags 37c.

When the cap 3 and the cap casing 37 are to be swaged, the phase angle between the two of them is determined in the following manner. The phase angle is determined so that the portions for welding 37d confront the portions of the side walls of the cap 3 that are formed between adjacent pairs of the gas venting apertures 3d provided in the side wall of the top portion 3b.

Or, this may also be done as described below. The positional relationship between the gas venting apertures 3d and the portions for welding 37d may be regulated so that, when the cap casing 37 has been folded back to the annular portion of the upper surface of the cap 3 and has been fixed thereto by swaging, and when the cap 3 thus fixed by the swaging is welded at certain spots for welding, the paths for conduction of electrical current between the portions for welding 37d and the side wall portions of the top portion 3b are not divided by the gas venting apertures 3d. Or, the positional relationship between the portions for welding 37d and the gas venting apertures 3d may be adjusted so that the gas venting apertures 3d do not lie upon the straight lines that join together the portions for welding 37d and the center of the cap 3.

Figure 9:
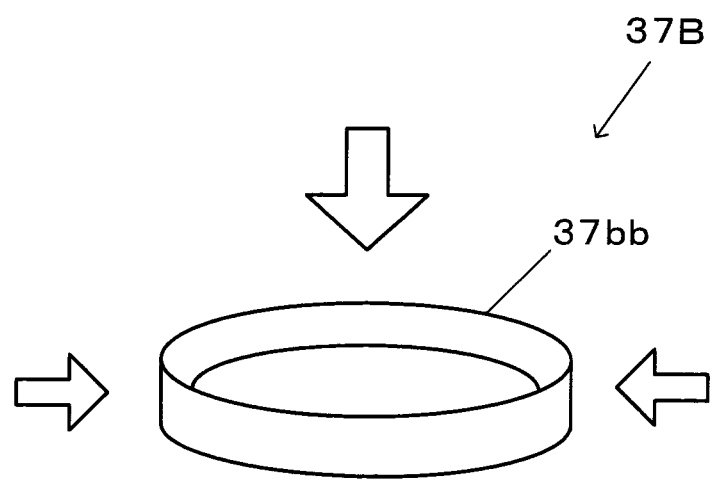
FIG. 9 is a perspective view showing a drawing process of the circular plate shown in FIG. 8.

As shown in FIG. 9, for making the cap casing 37, a circular plate shaped raw material portion 37A (refer to FIG. 8) is subjected to drawing processing (i.e. pressing processing as shown by the arrow signs) so that its outer periphery is raised into a circular ring 37bb, thus forming an intermediate workpiece 37B.

Figure 10:
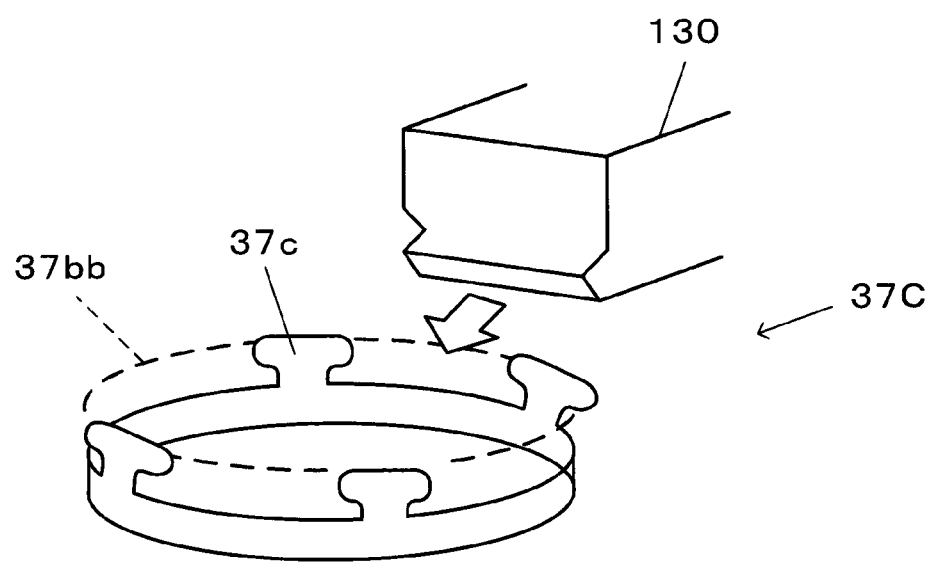
FIG. 10 is a perspective view showing a punching out process that is performed after the process of FIG. 9.

Then, as shown in FIG. 10, the portions between the adjacent projecting tags 37c, 37c are punched out from this circular ring 37bb of the intermediate workpiece 37B, for example by using a punch 130.

Figure 11:
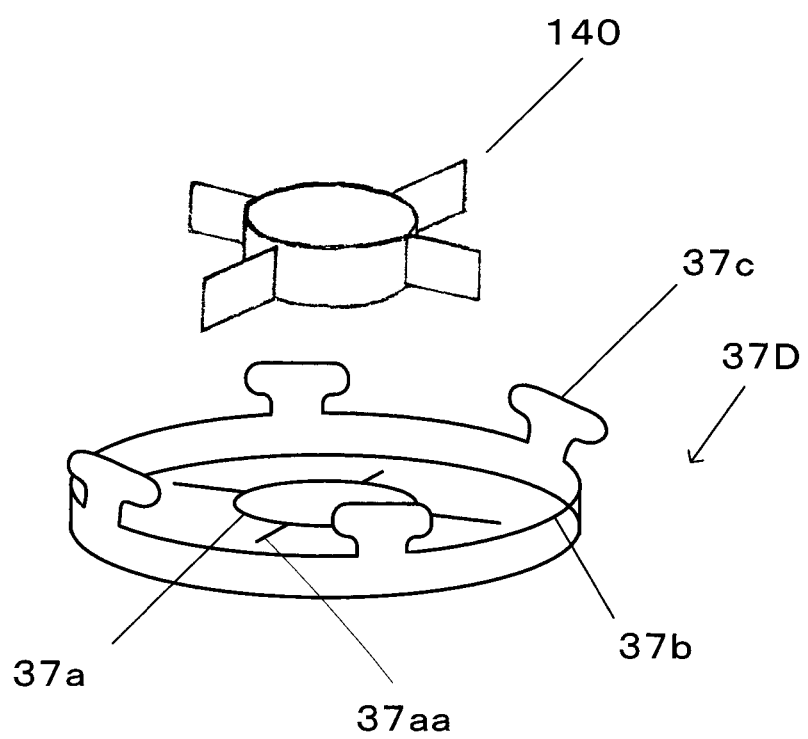
FIG. 11 is a perspective view showing a groove formation process by punching that is performed after the process of FIG. 10.

And then, as shown in FIG. 11, the cleavage grooves 37a, 37aa are incised upon the intermediate workpiece 37D that has been manufactured by the punching out process of FIG. 10, using an incision tool 140 for example, and thereby the manufacture of the cap casing 37 is completed. It should be noted that, after forming the cleavage grooves 37a and 37aa upon the bottom portion of the intermediate workpiece 37D, a circular step 37f (ref. FIGS. 2,3) which encircles the cleavage grooves 37a and 37aa is formed by pressing, through which the portion including the cleavages encircled with the step 37f is set lower in the FIG. 11. A detailed explanation about the step 37f is skipped.

The cap 3 is then fixed to the cap casing 37 that has been manufactured by the process shown in FIGS. 8 through 11. This fixing together of the cap casing 37 and the cap 3 is performed by processes of swaging and welding, as follows. Since initially the side wall 37b of the cap casing 37 is perpendicular to its case base portion as shown in FIG. 2, accordingly the peripheral part 3a of the cap 3 lies within the side wall 37b of the cap casing 37. And the side wall 37b of the cap casing 37 is deformed by being pressed inwards or the like, so that it is pressed into contact with and covers the peripheral portions of the upper and lower surfaces of the cap 3 and also its outer peripheral edge. Thereafter, the portions for welding 37d of the projecting tags 37c are welded.

Moreover, the connection plate 35 is fitted and fixed into the opening portion 41a of the insulation ring 41. And the projecting portion 35a of the connection plate 35 is welded to the bottom surface of the cap casing 37 to which the cap 3 is fixed. In this case, the welding method that is used may be low resistance welding or friction stir welding. By this welding together of the connection plate 35 and the cap casing 37 the manufacture of the sealing lid 50 is completed, with the cap 3, with the insulation ring 41 and the connection plate 35 fitted thereinto being fixed to it, being integrated with the connection plate 35 and the cap casing 37.

One end portion of the conducting positive electrode lead 33 is welded to the base portion 31a of the positive electrode current collecting member 31, for example by ultrasonic welding or the like. And the sealing lid 50, in which the cap 3, the cap casing 37, the connection plate 35, and the insulation ring 41 are integrated together, is placed so as to be near the other end portion of the conducting positive electrode lead 33. Then the other end portion of the conducting positive electrode lead 33 is welded to the lower surface of the connection plate 35 by laser welding. This welding is performed so that the bonding surface of the other end portion of the conducting positive electrode lead 33 to the connection plate 35 becomes the same as the bonding surface of the one end portion of the conducting positive electrode lead 33 that was welded to the positive electrode current collecting member 31.

The gasket 43 is fitted in above the groove 2a of the battery cell container 2. In this state, as shown in FIG. 2, the gasket 43 has a construction incorporating, above its annular base portion 43a, the outer circumferential wall portion 43b that is perpendicular to the base portion 43a. With this construction, the gasket 43 is held within the interior of the portion of the battery cell container 2 that is above the groove 2a. The gasket 43 is made from rubber, but this is not intended to be limitative; it could be made from any suitable material, for example from EPDM rubber (ethylene propylene diene monomer (M-class) rubber). Furthermore, for example, the battery cell container 2 may be made from carbon steel of thickness 0.5 mm and may have an external diameter of 40 mm, while the thickness of the gasket 43 may be around 1 mm.

The sealing lid 50, with the cap 3, the cap casing 37, the connection plate 35, and the insulation ring 41 integrated with it, is then placed on top of the cylinder portion 43b of the gasket 43. In detail, the cap casing 37 of the sealing lid 50 is mounted so that its peripheral portion corresponds to and fits within the cylinder portion 43b of the gasket 43. In this situation, it is arranged for the upper cylinder portion 31c of the positive electrode current collecting member 31 to fit over the outer circumferential surface of the flange 41b of the insulation ring 41.

In this state, the portion of the battery cell container 2 between its groove 2a and its upper end surface is compressed by pressure, and the sealing lid 50 is fixed to the battery cell container 2 along with the gasket 43 by a so called swaging process. The manufacture of the cylindrical type secondary battery cell shown in FIG. 1, in which the positive electrode current collecting member 31 and the cap 3 are electrically conductively connected together via the conducting positive electrode lead 33, the connection plate 35, and the cap casing 37, is completed in this manner.

The sealed battery cell explained above may be manufactured in the following manner. Copper foil of thickness 10 μm is used for the negative electrode sheet 12a. For the active negative electrode material, a negative electrode mixture including carbon particles of average particle diameter 20 μm is applied on both sides of this copper foil. This negative electrode mixture, for example, may include ten % by weight of binder (an adhesive material) consisting of polyvinylidene fluoride (made by Kureha Chemical Manufacturing K.K., product name KF #1120) (hereinafter abbreviated as PVDF) combined with 90% by weight of carbon particles. When applying this negative electrode mixture upon the copper foil, N-methyl-2-pyrrolidone (hereinafter termed NMP) is used as a dispersal solvent. A portion that is not painted with the negative electrode mixture is formed along the long direction of the copper foil on one side edge thereof, and the negative electrode leads 17 are also formed. After being dried, the negative electrode 12 is subjected to stamping processing, and is cut to a width of 90 mm.

Aluminum foil of thickness 20 μm is used for the positive electrode sheet 11a. For the active positive electrode material, a positive electrode mixture including lithium manganate particles of average particle diameter 10 μm is applied on both sides of this aluminum foil. This positive electrode mixture, for example, may include 10% by weight of carbon powder of average particle diameter 3 μm, for serving as an electrically conductive material, and 5% by weight of PVDF binder, combined with 85% by weight of lithium manganate particles. When the positive electrode mixture is applied upon the aluminum foil, NMP is used as a dispersal solvent. A portion that is not painted with the positive electrode mixture is formed along the long direction of the aluminum foil on one side edge thereof, similarly to the case with the negative electrode 12, and the positive electrode leads 16 are also formed. After being dried, the positive electrode 11 is subjected to press processing, similarly to the case with the negative electrode 12, and is cut to a width of 94 mm.

Perforated polyethylene film of thickness 25 μm and width 100 mm is used for the separators.

Aluminum of thickness 0.4 mm is used as the material for the cap casing 37, and cutaways of 0.5 mm radius are provided at the fixing bases of the projecting tags 37c of the swaged portion. Iron of thickness 0.6 mm plated with a thickness of around 5 μm of nickel is used as the material for the cap 3. Moreover, the diameter of the top portion 3b of the cap 3 is 23 mm and its height is 4 mm, and the diameter of each of the apertures 3d that are provided at intervals of 90° in its side portion is 5 mm. The melting point of the cap casing 37 is lower than the melting point of the cap 3. The size of the projecting tags 37c is W1=9 mm and W2=7 mm, and the amount by which they project from the flange is 4.5 mm.

In the friction stir welding of manufacturing the sealing lid 50, a rotating tool is used of which the diameter D of the end is 3.2 mm, the diameter d of the bulged portion at the center of its tip end surface is ½ of its diameter D, i.e. 1.6 mm, and the height h of the bulged portion is set to 0.1 mm. Connection by friction stir welding is thus performed at four spots on the projecting tags 37c of the swaged portion 5.

The assembly of this lithium secondary battery cell 1 may be performed in the following manner. First, the lid upper portion 30 of the sealing lid 50 is manufactured. In other words, the cap 3 is installed inside the flange portion of the cap casing 37 so that a side wall portion between two apertures 3d of the cylinder portion 3b faces to a tag 37c of the cap casing 37, and then the flange portion of the cap casing 37 is folded back over the cap 3 so that the flange portion 3a of the cap 3 are superimposed, and then the upper surface of the flange 37b is processed by swaging. Next, using a rotating tool having a tip with circular end surface whose center is slightly bulged out into a spherical shape and a backup member (i.e. an anvil) that supports the swage processed portion from below, friction stir welding is performed by pressing the rotating tool into contact with the projecting tags 37c from their upper surfaces, and thereby the cap casing 37 and the cap 3 are welded together into one unit, thus completing the manufacture of the lid upper portion 30 of the sealing lid 50. The upper lid portion 30 is then further assembled to the sealing lid 50, as described above.

After the generating unit 20 that has been manufactured by winding the positive electrode 11 and the negative electrode 12 described above together with the separators 13 and 14, and has been inserted into the battery cell container 2, the negative electrode side is electrically connected, and the sealing lid 50 and the generating unit 20 are electrically connected together via the conducting positive electrode lead 33. And, after having been filled with the non-aqueous electrolyte, the battery cell is sealed by swage fixing the battery cell container 2 and the sealing lid 50 together via the gasket 43.

For the non-aqueous electrolyte, one mole/liter of lithium hexafluorophosphate (LiPF6) dissolved in a solvent mixture of ethylene carbonate (EC), dimethyl carbonate (DMC), and diethyl carbonate (DEC) may be used.

In this example, the lithium secondary battery cell 1 has a diameter of 40 mm, a height of 110 mm, and a capacity of 6 Ah.

A Comparison Example

Figure 7:
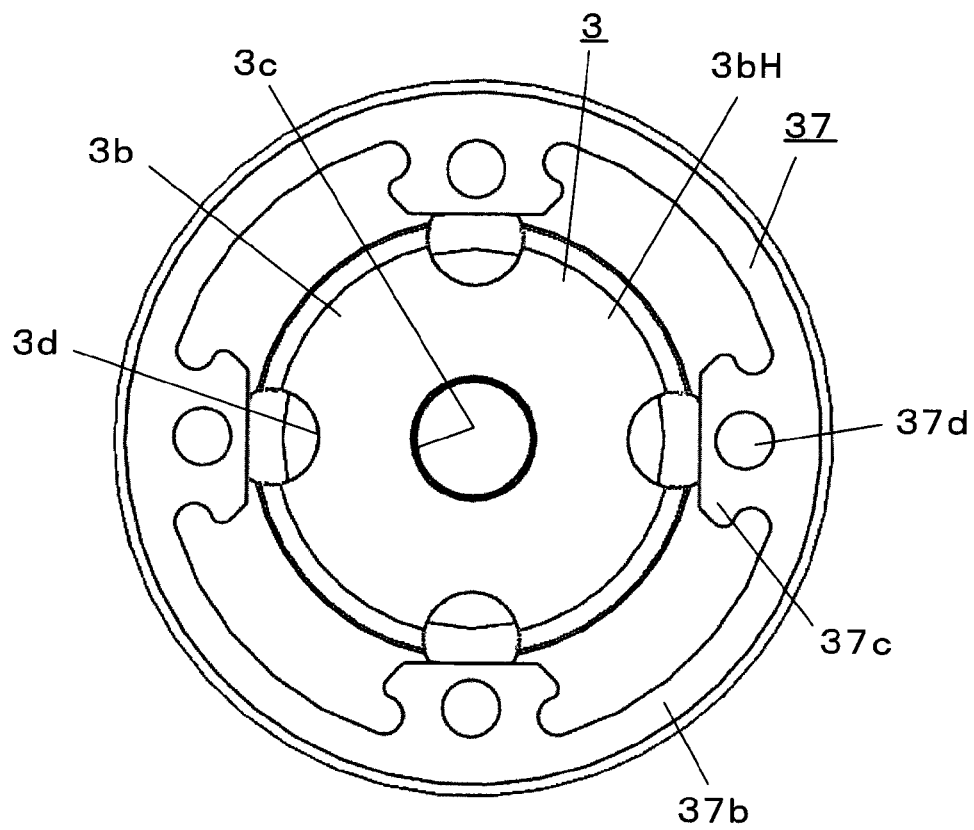
FIG. 7 is a plan view showing this sealing lid of the comparison example.
Figure 8:
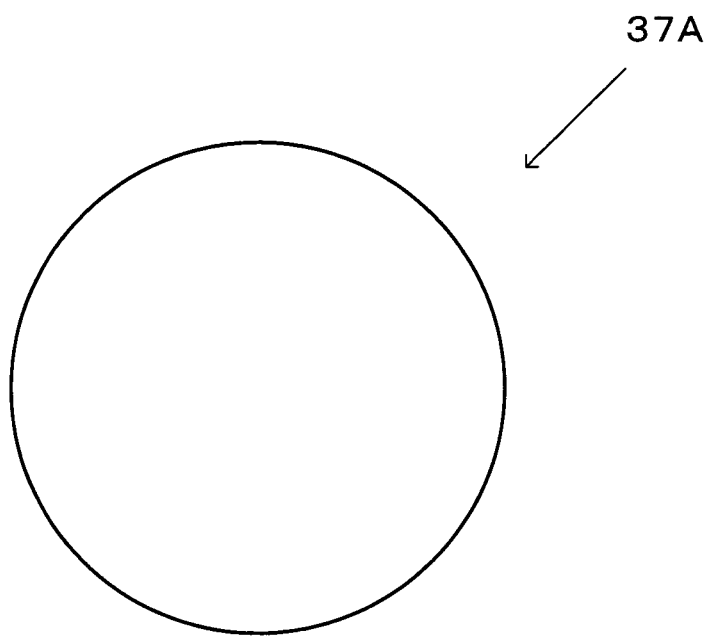
FIG. 8 is a plan view showing the a diaphragm that is a circular plate before processing into a cap casing of the lid unit of FIG. 4.

FIGS. 6 and 7 are a perspective view and a plan view of a sealing lid of a comparison example. It should be understood that, in these figures, to portions that are the same or that correspond to portions of the embodiment described above, the same reference symbols are appended, and explanation thereof is omitted.

With this sealing lid of the comparison example, the four portions for welding 37d are arranged so as each to point at one of the four apertures 3d of the top portion 3b. To put this in another manner, the arrangement of this comparison example is that the projecting tags for welding 37c confront the apertures 3d of the top portion 3b in the radial direction.

Testing And Evaluation

For the sealing lids of the lithium secondary battery cells manufactured according to the embodiment and according to the comparison example, the resistance value between the cap 3 and the cap casing 37 was measured by measuring, using a four wire type measurement device, the voltage value when a current of 10 A was flowed between the cap 3 and the cap casing 37, and by calculating the resistance value from the result.

As shown in FIG. 6, the apertures 3d on the top portion 3b that confront the portions for welding 37d are interposed on the paths from the portions for welding 37d, so that the electrical current path is formed as divided in CF1 and CF2 on the side wall of the top portion 3b. In other words, these electrical current paths CF1 and CF2 are defined so as to branch off to both sides in the regions between the side wall of the top portion 3b and the portions for welding 37d. The path lengths of these electrical current flow paths CF1 and CF2 are made longer by such branching, and accordingly the electrical resistances of the electrical current flow paths CF1 and CF2 become large. In contrast with the resistance value of the sealing lid 50 of the embodiment that was found to be about 130 μΩ, the resistance value of the comparison example was found to be about 170 μΩ.

In other words, with the sealing lid 50 of the embodiment, the influence of the apertures 3d upon the electrical current paths CF is reduced to a minimum, whereas, with the sealing lid of the comparison example, the electrical current paths are disturbed by the apertures 3d, so that the electrical current is divided in the paths CF1 and CF2. Since the influence of this disturbance of the electrical current paths changes with the positional relationship of the portions for welding 37d and the apertures 3d, accordingly, with a structure in which this disturbance occurs, the electrical resistance changes according to variations in the processing and in the assembly, and thus is unstable.

Variant Embodiments (1) While, in the embodiment described above, four of the apertures 3d were provided as spaced at regular intervals around the periphery of the top portion 3b, this is not to be considered as being limitative; it would also be possible to provide a larger number of the apertures 3d, within the range in which the strength of the cap 3 can be guaranteed; or it would also be possible to provide a smaller number of the apertures 3d. Furthermore, the arrangement of the apertures 3d is not limited to being regular spacing; they could also be spaced at irregular intervals. However, in order to ensure that the electrical current paths are uniform, the portions for welding 3d should be positioned so as to confront and approach towards the side wall of the top portion 3b between mutually adjacent pairs of the opening portions 3d. Desirably, the portions for welding 3d should confront and approach towards the center regions of the portions of the side wall of the top portion 3b between mutually adjacent pairs of the opening portions 3d.

(2) While in the above description the number of the opening portions 3d and the number of the portions for welding 37d were made to be the same, if the number of the opening portions 3d is termed N (N: natural number), it would also be acceptable to arrange for the number of the portions for welding 37d, in other words the number of the projecting tags 37c, to be a value smaller than N. The number of the opening portions 3d and their cross sectional areas are determined so that the total flow conduit area is properly adapted to the amount of gas to be vented when the pressure of the gas within the battery cell is the predetermined value or greater, and the number of the portions for welding 37d and their area are determined on the basis of the acceptable resistance value according to the charge and discharge currents for the battery cell. Accordingly, it would also be possible for the number of the opening portions 3d and the number of the projecting tags 37c not to be the same.

(3) While, in the embodiment described above, the projecting tags 37c were welded to the cap 3 by friction stir welding, if the cap 3 and the cap casing 37 are made from the same type of metal, i.e. aluminum alloy, then it would also be possible to employ some other type of welding method, such as laser beam welding or the like.

(4) While, with the lithium secondary battery cell of this embodiment, examples were described in which the cap casing 37 was made from aluminum, and the cap 3 was made from nickel plated iron, the present invention is not to be considered as being limited by this feature. For example, it would also be acceptable to arrange for the cap casing 37 to be made from aluminum alloy, while the cap 3 is made from carbon steel, stainless steel, or nickel. By doing this, it is possible to ensure that the melting point of the cap casing 37 is lower than that of the cap 3. By plating the cap 3 with a soft metal like nickel or copper or the like, satisfactory welding can be easily performed because it is easy to remove the surface oxide film on the cap 3 to activate the junction interface, but the use of nickel plated carbon steel is desirable from the point of view of cost and so on.

(5) While, in this embodiment, one example was disclosed of the shape of the tip end portion of the rotating tool that was used for friction stir welding, the present invention is not to be considered as being limited by this example; it would also be acceptable to change this shape to match the size of the portion to be welded and so on.

(6) While, with the lithium secondary battery cell 1 of this embodiment, lithium manganate was disclosed by way of example for the active positive electrode material, the present invention is not to be considered as being limited to the use of this material. As other active positive electrode materials that can be employed instead of the one of this embodiment, for example, a compound lithium transition metal oxide, such as lithium nickel oxide or lithium cobalt oxide, would also be acceptable. Furthermore while, in this embodiment, carbon particles were disclosed for the active negative electrode material, the present invention is not to be considered as being limited by this; it would be acceptable to employ amorphous carbon or graphite or the like, such as used in a conventional lithium secondary battery cell.

(7) While, with the lithium secondary battery cell 1 of this embodiment, lithium hexafluorophosphate dissolved in a mixture solvent such as ethylene carbonate or the like at one mole per liter was used by way of example for the non-aqueous electrolyte, the non-aqueous electrolyte that can be used for the present invention is not to be considered as being particularly limited. For the organic solvent and the lithium salt, it would be possible to employ any substances that can normally be used in a lithium ion secondary battery cell, for example a lithium salt dissolved in an organic solvent used independently or as a mixture, such as carbonate series, sulfolane series, ether series, lactone series, or the like. Furthermore, the mixing ratio for the organic solvent and the amount of the lithium salt to be included are not to be considered as being particularly limited.

(8) While, in this embodiment, an example was disclosed of a lithium secondary battery cell 1 for high current discharge having a capacity of 6 Ah, the present invention is not to be considered as being limited by this feature; the present invention could also be applied, if considered appropriate, to a battery cell having a capacity of 35 Ah or higher. Moreover the present invention could also be applied, as appropriate, to a battery cell for an electric automobile that uses high current discharge, for example to one that uses 500 amperes or more for starting an engine-starter motor; and it could also be employed, if considered appropriate, for a power supply for an electric bicycle that is used for helping with hill climbing. And furthermore, the shape and size and so on of the battery cell are not to be considered as being particularly limited.

Provided that the distinguishing features of the present invention are not abandoned, the present invention is not to be considered as being limited to the embodiments described above. Accordingly, the present invention is defined as being a sealed battery cell including a generating unit 10, a battery cell container 2 within which the generating unit is stored, and a sealing lid 50 that seals the battery cell container 2, wherein the sealing lid 50 comprises a cap 3 that constitutes an external positive electrode terminal for the battery cell 1, and a cap casing 37 that is integrated with the cap 3; and wherein: the cap 3 is a hat shape, having a top portion 3b and an annular portion 3a, and the top portion 3b which functions as the external positive electrode terminal projecting to the exterior of the battery cell 1 in its axial direction; a plurality of apertures 3d for venting gas are provided upon a side wall of the top portion 3b of the cap 3 at predetermined intervals; and the cap casing 37 is fixed to an upper surface of the annular portion 3a of the cap 3 by folding back and swaging the flange 37b, and is welded to the cap 3 at the welding spots 37d of the tags 37c provided on the flange 37b; and the welding spot 37d is defined as an approximately central portion of a tag 37c facing the side wall of the top portion 3b between two adjacent apertures 3d.

In the above description, a tag 37c for welding is provided on the flange 37b, and welding is carried out at the approximately central portion 37d of the tag 37c by friction stir welding. However, it may also be accepted that with the cap casing 37B which has no tags, as shown in FIG. 9, the flange 37bb is folded back to the center of cap 3 and swaged, and that the welding to the annular portion 3a of cap 3 is done on the flange portion 37bb which is folded back and swaged.

Therefore, in a sealed battery cell according to the present invention, these welding spots may be arranged as defined in any of the various ways described in (1) through (3) below, which can be applied to various types of sealed battery cells.

(1) The welded spots may be determined as being spots that confront the side wall of the top portion of the cap between mutually adjacent pairs of the gas venting apertures that are provided in the side wall of the top portion.

(2) It would also be acceptable to arrange to regulate the positional relationship between the welded spots and the gas venting apertures so that the paths for electrical current between the welded spots and the side wall of the top portion are not divided by the gas venting apertures.

(3) It would also be acceptable to arrange to regulate the positional relationship between the welded spots and the gas venting apertures so that the gas venting apertures do not lie upon the straight lines that join the welded spots and the center of the cap.

Furthermore, another aspect of the present invention is a method for manufacturing a sealed battery cell that includes a generating unit, a battery cell container within which the generating unit is stored, and a sealing lid that seals the battery cell container, including: a process of manufacturing the generating unit; a process of manufacturing the sealing lid; a process of, after putting the generating unit into the battery cell container, electrically connecting the generating unit to an external positive electrode terminal of the sealing lid, and to an external negative electrode terminal of the battery cell bottom surface; and a process of, after putting the generating unit into the battery cell container, sealing the battery cell container with the sealing lid; and wherein: the process of manufacturing the sealing lid includes a process of manufacturing the cap, a process of manufacturing the cap casing, and a process of integrating the cap and the cap casing; the process of manufacturing the cap includes: a process of forming a hat shape with a top portion that projects to the exterior of the battery cell and an annular portion; and a process of providing a plurality of apertures for venting gas at predetermined intervals in the side wall of the top portion; and the process of integrating the cap and the cap casing includes: a process of fixing a outer circumferential region of the cap casing to an upper surface of the annular portion of the cap by folding back and swaging; and a process of welding the cap and the cap casing together by this folded back of the outer circumference region; in which the spots that are welded (hereinafter termed the welded spots) are arranged as defined by any of the various methods described in (1) through (3) below.

(1) Before the process of fixing by swaging, there may be included a process of performing positional alignment between the cap and the cap casing, so that the spots at which welding is to be performed confront the side wall of the top portion of the cap between mutually adjacent pairs of the gas venting apertures that are provided in the side wall of the top portion.

(2) It would also be acceptable to arrange to regulate the positional relationship between the portions for welding and the gas venting apertures so that the paths for electrical current between the welded spots and the side wall of the top portion are not divided by the gas venting apertures.

(3) It would also be acceptable to arrange to regulate the positional relationship between the portions for welding and the gas venting apertures so that the gas venting apertures do not lie upon the straight lines that join the welded spots and the center of the cap.

While various embodiments and variant embodiments have been explained above, the present invention is not to be considered as being limited by the details thereof. Other possibilities that may be considered to lie within the scope of the technical concept of the present invention are also included within the range of the present invention.

What is claimed is:

1. A sealed battery cell comprising a generating unit, a battery cell container within which the generating unit is stored, and a sealing lid that seals the battery cell container, wherein:
    the sealing lid comprises a cap that constitutes an external positive electrode terminal for the sealed battery cell, and a cap casing that is integrated with the cap;
    the cap is a hat shape having a top portion and an annular portion, of which top portion is the external positive electrode terminal, and projects to the exterior of the battery cell in axial direction;
    a plurality of gas venting apertures are provided upon a side wall of the top portion of the cap at predetermined intervals;
    an outer circumferential region of the cap casing is fixed to an upper surface of the annular portion of the cap by folding back and swaging, and is welded to the cap at a welding spot where this fixing by swaging is performed; and
    the welding spot confront a portion of the side wall of the top portion that are between an adjacent pair of the gas venting apertures provided in the side wall of the top portion.

2. A sealed battery cell according to claim 1, wherein the welding spot confront a central portions of the side wall of the top portion defined between the adjacent pair of gas venting apertures.

3. A sealed battery cell according to claim 1, wherein, when N gas venting apertures are present, N welding spots that are provided, where N is an natural number.

4. A sealed battery cell according to claim 1, wherein, in the cap casing, a plurality of cleavage grooves that cleave and open when an internal pressure of the sealed battery cell rises above a predetermined threshold value are provided, and the plurality of gas venting apertures are provided in positions that correspond to the plurality of cleavage grooves.

5. A sealed battery cell according to claim 4, wherein the gas venting apertures in the cap and the cleavage grooves in the cap casing are provided at equal angular intervals around the circumferential direction of the sealing lid, and the cap and the cap casing are integrated together at a phase angle at which the gas venting apertures and the cleavage grooves mutually confront one another.

6. A sealed battery cell according to claim 1, wherein:
    a projecting tag for welding is formed at the outer circumferential region of the cap casing, and in a state that the outer circumferential region of the cap casing is folded back and swaged to the upper surface of the annular portion of the cap, the cap and the cap casing are welded together, assuming the projecting tag for welding as the welding spot.

7. A sealed battery cell according to claim 6, wherein the projecting tag for welding have a link portion that connects to the outer circumferential region of the cap casing and a tip end portion that is widened out from the link portion towards the center of the cap.

8. A sealed battery cell according to claim 1, wherein the cap and the cap casing are welded together by friction stir welding.

9. A sealed battery cell comprising a generating unit, a battery cell container within which the generating unit is stored, and a sealing lid that seals the battery cell container, wherein:
    the sealing lid comprises a cap that constitutes an external positive electrode terminal for the sealed battery cell, and a cap casing that is integrated with the cap;
    the cap is a hat shape having a top portion and an annular portion, of which top portion is the external positive electrode terminal and projects to the exterior of the battery cell in axial direction;
    a plurality of gas venting apertures are provided upon a side wall of the top portion of the cap at predetermined intervals;
    an outer circumferential region of the cap casing is fixed to an upper surface of the annular portion of the cap by folding back and swaging, and is welded to the cap at a welding spot where this fixing by swaging is performed; and
    a positional relationship between the welding spot and the gas venting apertures is regulated so that a path for electrical current between the welding spot and the side wall of the top portion is not divided by the gas venting apertures.

10. A sealed battery cell comprising a generating unit, a battery cell container within which the generating unit is stored, and a sealing lid that seals the battery cell container, wherein:
    the sealing lid comprises a cap that constitutes an external positive electrode terminal for the sealed battery cell, and a cap casing that is integrated with the cap;
    the cap is a hat shape having a top portion and an annular portion, of which top portion is the external positive electrode terminal, and projects to the exterior of the battery cell in axial direction;
    a plurality of apertures for venting gas are provided upon a side wall of the top portion of the cap at predetermined intervals;
    an outer circumferential region of the cap casing is fixed to an upper surface of the annular portion of the cap by folding back and swaging, and is welded to the cap at a welding spot where this fixing by swaging is performed; and
    a positional relationship between the welding spot and the gas venting apertures is regulated so that the gas venting apertures do not lie upon a straight line that join the welding spot and the center of the cap.

11. A method of manufacturing a sealed battery cell that comprises a generating unit, a battery cell container within which the generating unit is stored, and a sealing lid that seals the battery cell container, comprising:
    a process of manufacturing the generating unit;
    a process of manufacturing the sealing lid;
    a process of, after putting the generating unit into the battery cell container, electrically connecting the generating unit, an external positive electrode terminal of the sealing lid, and an external negative electrode terminal of a battery cell bottom surface; and a process of, after putting the generating unit into the battery cell container, sealing the battery cell container with the sealing lid;

and wherein:

the process of manufacturing the sealing lid comprises a process of manufacturing the cap, a process of manufacturing the cap casing, and a process of integrating the cap and the cap casing;

the process of manufacturing the cap comprises:

a process of forming a hat shape having a top portion that projects to the exterior of the battery cell, and an annular portion; and a process of providing a plurality of gas venting apertures at predetermined intervals in the side wall of the top portion;

and the process of integrating the cap and the cap casing comprises:

a process of swage fixing a circumferential region of the cap casing to an upper surface of the annular portion of the cap by folding back and swaging;

a process of welding the cap and the cap casing together at a welding spot on this folded back circumferential region; and a process of, before the swage fixing, performing position alignment of the cap and the cap casing, so that the welding spot at which the welding is performed confront the top portion side wall at a location between an adjacent pair of gas venting apertures that are provided in the side wall of the top portion of the cap.

12. A method of manufacturing a sealed battery cell according to claim 11, wherein the cap and the cap casing are welded together by friction stir welding.

* * * * *